US012047645B1

(12) United States Patent
Hao et al.

(10) Patent No.: US 12,047,645 B1
(45) Date of Patent: Jul. 23, 2024

(54) AGE-APPROPRIATE MEDIA CONTENT RATINGS DETERMINATION

(71) Applicant: Amazon Technologies, Inc., Seattle, WA (US)

(72) Inventors: Xiang Hao, Redmond, WA (US); Ahmed Aly Saad Ahmed, Bothell, WA (US); Diana Nassar, Seattle, WA (US); Mohamed Kamal Omar, Seattle, WA (US); Steven James Cox, Mill Creek, WA (US); Saida Lehiany, Southington, CT (US)

(73) Assignee: Amazon Technologies, Inc., Seatle, WA (US)

( * ) Notice: Subject to any disclaimer, the term of this patent is extended or adjusted under 35 U.S.C. 154(b) by 103 days.

(21) Appl. No.: 17/698,798

(22) Filed: Mar. 18, 2022

(51) Int. Cl.
*H04N 21/466* (2011.01)
*G06V 20/40* (2022.01)
*H04N 21/258* (2011.01)

(52) U.S. Cl.
CPC ......... *H04N 21/4665* (2013.01); *G06V 20/47* (2022.01); *H04N 21/25883* (2013.01); *G06V 2201/10* (2022.01)

(58) Field of Classification Search
CPC ......... H04N 21/25883; H04N 21/4665; G06V 20/47; G06V 2201/10
See application file for complete search history.

(56) References Cited

U.S. PATENT DOCUMENTS

| | | | |
|---|---|---|---|
| 9,674,579 B1* | 6/2017 | Jaini | H04N 21/4668 |
| 10,897,649 B1* | 1/2021 | Germano | G06N 20/00 |
| 2019/0007738 A1* | 1/2019 | Fung | H04N 21/25825 |
| 2023/0188788 A1* | 6/2023 | Blakemore | H04N 21/84 |
| | | | 725/28 |

* cited by examiner

*Primary Examiner* — Nicholas T Corbo
(74) *Attorney, Agent, or Firm* — Lee & Hayes, P.C.

(57) ABSTRACT

A system can be utilized to retrieve media content and rating schemas, to determine maturity ratings for media content. The media content can be utilized to determine segments of data as building blocks associated with mature content. The building blocks can be mapped to content descriptors and rating levels associated with the rating schemas. The building blocks can be compared the media content to identify portions of the media content that have characteristics represented by the building blocks. The building blocks representing the characteristics in the portions of the media content can be utilized to select content descriptors and rating levels associated with the media content. The selected content descriptor and selected rating levels can be utilized to control how, and/or whether, the media content is made available for output to the consumers.

20 Claims, 8 Drawing Sheets

AGE-APPROPRIATE MEDIA CONTENT RATINGS DETERMINATION

BACKGROUND

Consumers are increasingly shopping for media content that is accessible in an online environment, such as via websites or mobile applications. Areas in which the consumers are located, as well as areas in which the media content is generated, may be expanding on a worldwide basis. For example, the online environment can store large quantities of the media content to enable the media content to be streamed from many different countries. Rating schemas may be utilized by the countries to enable the consumers to make educated viewing decisions based on whether the media content includes any mature content.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
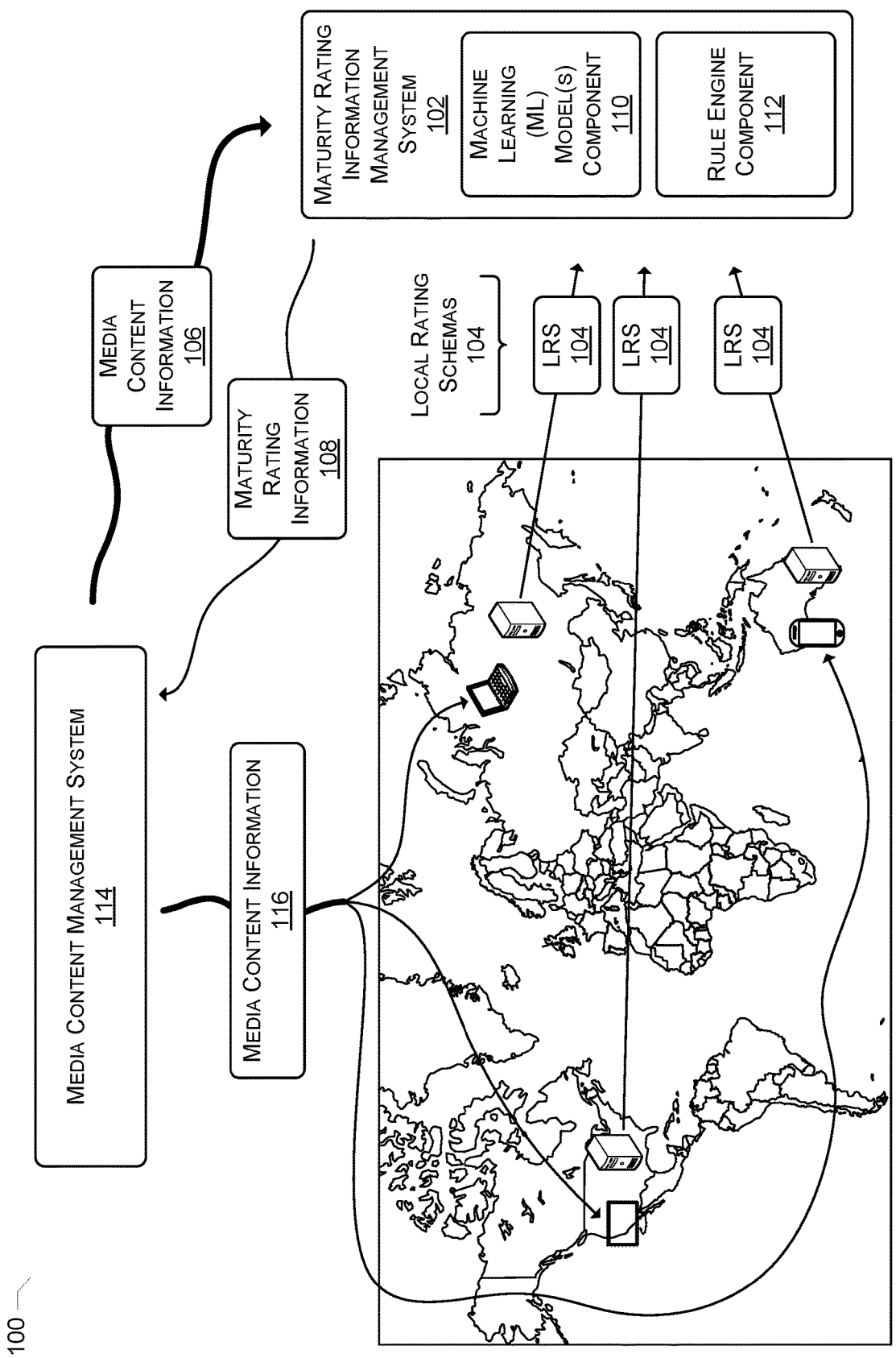
FIG. 1 is an illustrative environment for determining age-appropriate media content ratings, in accordance with some examples of the present disclosure.

This disclosure describes various systems, devices, and methods for determining maturity ratings for media content. In various examples, the media content and rating schemas can be retrieved from databases in territories around the world. The media content, or other media content, can be utilized to determine segments of data as building blocks associated with mature content. The building blocks can be mapped to content descriptors and rating levels associated with the rating schemas. The building blocks can be compared the media content to identify portions of the media content that have characteristics represented by the building blocks. The building blocks representing the characteristics in the portions of the media content can be utilized to select content descriptors and rating levels associated with the media content. The selected content descriptors and selected rating levels can be utilized to control how, and/or whether, the media content is made available for output to the consumers.

Machine learning (ML) models of various types can be utilized to determine the segments of data as building blocks. The building blocks can be associated with the segments of data via automation (e.g., full automation or partial automation). In various examples, the ML models can include an ML model that is utilized to identify all types of the mature content (e.g., violence, drugs, alcohol, intimate contact, etc.). In additional or alternative examples, the ML models can include individual ML models that are utilized to identify corresponding types, and/or sub-types, of the mature content (e.g., use of drugs, drug paraphernalia, sale of drugs, etc.). In additional or alternative examples, the ML models can input video files utilized to identify the mature content. In additional or alternative examples, the ML models can input video clips utilized to identify the mature content. The ML models can generate classifications, localizations, and indexes associated with the segments of data. The classifications, the localizations, and the indexes can be input to the ML models to re-use the ML models for other territories.

Rule engines can be utilized to determine maturity ratings for the media content. The mapped building blocks and the rating schemas can be input into the rule engines that associate content descriptors with the segments of the media content. The content descriptors can be utilized by the rule engines to associated rating levels with the segments of the media content. The content descriptors and the rating levels associated with the segments of data may vary based on differences between the rating schemas. Segments of the media content can be flagged for review by users based on scores associated with the mapped building blocks.

Output of the media content, and/or information associated with the media content, can be controlled based on the content descriptors and the rating levels. In various examples, accessibility of information associated with, and utilized to request output of, the media content can be controlled based on the rating levels. In additional or alternative examples, output of the media content can be controlled based on the rating levels. In additional or alternative examples, portions of the media content utilized in playback of the media content can be controlled based on the rating levels.

Furthermore, the techniques described herein provide various technical advantages for maturity rating determination. The maturity media content ratings determination system optimizes usage of computing resources since maturity ratings for content in different countries/territories throughout the world can be determined Instead of determining maturity ratings for each country/territory separately and individually, the maturity ratings for different countries/territories are determined using a single system.

Utilizing the single system for determining the maturity ratings enables information for maturity ratings determinations for any country/territory to be shared for maturity ratings determinations for any other country/territory. Information (e.g., the segments of data associated with mature content) utilized for analysis with any rating schema can be utilized for analysis with any other rating schema. Unlike conventional systems that perform separate and independent analysis for each of the rating schemas, computer resources can be conserved by reusing the segments of data that include the characteristics of the mapped building blocks. The computer resources that would otherwise be required for analysis of the media content according to conventional technology can be reallocated for other purposes.

Moreover, the techniques described herein optimize network performance by reducing output of the media content. For instance, by utilizing the building blocks for full or partial automation of maturity rating determinations, output of the media content to determine the maturity ratings that would otherwise be required any number of times according to conventional technology can be avoided. The network bandwidth that would otherwise have been required for output of the media content is therefore available for other purposes. The segments of data that include the characteristics of the mapped building blocks can also be reused for generation of maturity ratings due to institution and/or creation of new rating schemas that did not previously exist. By reducing the overall amount of times that the media content needs to be transmitted for purposes of determining maturity ratings for new and existing rating schemas, the quality and speed of transmissions of the media content for purposes of streaming and/or viewer playback can be improved.

Various implementations disclosed herein provide a number of advantages over other techniques for generating maturity ratings. For instance, utilizing full automation or partial automation to generate the content descriptors and the maturity ratings significantly decreases amounts of time otherwise required to perform manual analysis of the media content. Manual analysis requires individual inspections of the media content and customized applications of the different rating schemas of the various territories to determine the appropriate content descriptors and rating levels that satisfy the rating schemas. As the rate at which media content is generated continues to increase, performing manual analysis to determine the content descriptors and rating levels at a commensurate rate becomes impractical.

Moreover, utilizing the building blocks is more accurate than performing a partially automated analysis with a single global schema according to conventional technology. Utilizing the global schema inevitably results in problems due to subtleties and nuances present in differences between global content descriptors and local content descriptors, as well as in differences between global maturity ratings and local maturity ratings. The number of local rating schemas throughout the world is very large, as well as the variety thereof. As such, converting the global content descriptors and the global maturity ratings to the local content descriptors and the local maturity ratings, respectively, is unfeasible, if not extremely complex and time intensive.

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

FIG. 1 is an illustrative environment 100 for determining age-appropriate media content ratings, in accordance with some examples of the present disclosure. As illustrated, the environment 100 includes a maturity (or "age-appropriate") rating information management system 102. The maturity rating information management system 102 can receive rating schema information, including one or more local rating schemas 104(1)-104(7) (collectively referred to as local rating schema(s) 104). The rating schema information can be received from different territories (e.g., continents, countries, portions of countries, regions, cities, etc.). The rating schema information received from the territories can include the rating schema information received from one or more computing devices (e.g., server(s)) in the territories. In some examples individual rating schema(s) 104 can be received from corresponding territories. In those examples, for instance, the rating schema information can include individual rating schema(s) 104 being received from different territories. In alternative or additional examples, any of the rating schema(s) 104 can be received from the same territory as for other rating schema(s) 104.

The rating schema(s) 104 can include information for determining maturity media content ratings (e.g., rating(s) in the maturity rating information 108, as discussed below). Any of the rating schema(s) 104 can be received from one or more computing systems (e.g., the third-party system 710, as discussed below with reference to FIG. 7) in any of the territories. The rating schema(s) 104, and/or the information associated therewith, can include rules, guidelines, and/or standards established by the territories indicating how to rate the media content. By way of example, with respect to the United States, the rating schema(s) 104 can include a motion picture association of America (MPAA) schema. Although the rating schema information can include the local rating schemas 104(1)-104(7) as discussed above in the current disclosure, it is not limited as such. In some examples, any number and/or type of local rating schemas can be received viewer and utilized for any techniques discussed herein.

The maturity rating information management system 102 can receive media content information 106 (e.g., information including unrated media content and/or metadata associated with unrated media content) and determine maturity rating information 108 based on the local rating schema(s) 104. The media content information 106 can be retrieved from a database (e.g., a database in the maturity rating information management system 102, or another internal or external system). Determining the maturity rating information 108 can be performed via full automation or partial automation. The maturity rating information 108 can be determined based on segments of data (or "building blocks") representing mature (or "age-sensitive") content being mapped to portions of the unrated media content 106. The maturity rating information 108 can include content descriptors and maturity ratings determined based on the media content information 106 (e.g., descriptors and maturity ratings associated with media content in the media content information 106).

The maturity rating information management system 102 can include a machine learning (ML) model(s) component 110 and a rule engine component 112. The ML model(s) component 110 can include one or more ML models to determine data segments of the media content information 106 that are associated with mature content. The rule engine component 112 can determine the maturity rating information 108, including the content descriptors and the maturity ratings, associated with the media content information 106.

Although the ML model(s) component 110 and the rule engine component 112 can be separate, as discussed above in the current disclosure, it is not limited as such. A portion (e.g., a partial portion or an entire portion) or the ML model(s) component 110 can be integrated with a portion (e.g., a partial portion or an entire portion) of the rule engine component 112.

As a hypothetical example, the ML model(s) component 110 can include ML model(s) that are trained and then used for determining maturity ratings for other content. To train the ML model(s), media content, such as a movie, can be analyzed by a user (e.g., an operator), via a user device (e.g., the user device(s) 702, as discussed below with reference to FIG. 7). The user device can stream the movie, which is accessible from the maturity rating information management system 102. The user device can receive user input and provide 1) information (e.g., timestamps) about portions of the movie and/or information (e.g., identifiers of pixels in a frame of the movie) depicting the objects/actions, 2) segments of data (e.g., the building blocks) associated with the depictions of the objects/actions, and 3) relationships therebetween. The portions of the movie depicting the objects/actions can be selected by the user based on a rating that is appropriate for the territory. The user can review the movie, select the portions with mature content, and identify/associated content descriptors with the reviewed portions. The user can provide information (e.g., information used as training data) including the portions of the movie associated with the content descriptors, and/or the objects/actions associated with the content descriptors. The content descriptors can be analyzed and used to determine a content descriptor for the movie, and a movie rating based on the content descriptor.

The maturity rating information management system 102 can include a media content management system 114. The maturity rating information management system 102 can store and/or transmit the maturity rating information 108 to the media content management system 114. The media content management system 114 can determine and store media content information 116 (e.g., information including rated media content) based on the media content information 106 and the maturity rating information 108.

Media content for which rating information has been determined can be managed, stored, and/or transmitted, in various ways. In some examples, the rated media content in the media content information 116 can include, as rated media content, a portion (e.g., a partial portion or an entire portion) of the media content information 106 that is associated with the maturity rating information 108 (e.g., a combination of the unrated media content in the median content information 106 and the maturity rating information 108 can be determined as rated media content included in the media content information 116). In alternative or additional examples, the media content information 116 can include the maturity rating information 108 (e.g., the rated media content, which can be linked to the maturity rating information 108, can be transmitted and/or managed separately from, the maturity rating information 108). In alternative or additional examples, the media content information 116 can include both the rated media content and the maturity rating information 108 (e.g., the rated media content, which can be linked, but managed as separate information from, the maturity rating information 108, can be transmitted together with the maturity rating information 108).

Media content for which rating information has been determined can be associated with, and/or linked to, the rating information in various ways. In some examples, the rated media content (e.g., individual media portions, such as video files and/or video clips, and/or one or more other files include therewith) that is linked with the maturity rating information 108 can include information utilized to locate the maturity rating information 108 (e.g., the corresponding content descriptors and/or the corresponding maturity ratings). In those examples, the rated media content (e.g., individual media portions, such as video files and/or video clips, and/or one or more other files include therewith), can include one or more identifiers of, and/or information identifying a location of, the maturity rating information 108 (e.g., the corresponding content descriptors and/or the corresponding maturity ratings).

The media content management system 114 can determine availability of the rated media content in the media content information 116 for transmission to one or more remote devices (e.g., the user device(s) 702, as discussed below with reference to FIG. 7) in the territories associated with the local rating schemas 104. The availability of the rated media content in the media content information 116 for transmission can be determined based on the maturity rating information 108 and/or ages of individual users associated with the device(s).

The rated media content in the media content information 116 can be transmitted to the remote device(s) based on requests received by the remote device(s). In some examples, a request can be received from a remote device to receive video content in a video file including a portion of the rated media content. The request can be received, by the media content management system 114 and from the remote device, based on a selection of a video content identifier indicated via user input received by a user interface of the remote device. The media content management system 114 can determine, based on the request, that one or more portions of the video content are authorized based on the age-appropriate rating level. The media content management system 114 can cause, via the remote device and based on the one or more portions of the video content being authorized, output of the video content in the video file.

In some examples, one or more of any techniques performed by the maturity rating information management system 102 can be performed based on one or more requests from external devices (e.g., devices of third-parties). By way of example, a request can be received from an external device (e.g., a device of a third-party), a remote device (e.g., a device of any user), or any other device of any type. The request can include, and/or indicate, media content (e.g., unrated media content). The request can further include supplemental information (e.g., a location associated with the device from which the request is received, one or more rating schemas associated with the location of the device and/or any of one or more territories including the device or other devices, one or more destination locations and/or one or more identifiers of corresponding devices to receive any information determined based on the request, etc.). The maturity rating information management system 102 can process the request to determine maturity rating information and/or rated media content information, in a similar way as for the maturity rating information 108 and/or the rated media content in the media content information 116, respectively. The maturity rating information management system 102 can transmit any of the maturity rating information and/or the rated media content information to the device from which the request was received or any other device. The transmitting of the maturity rating information and/or the rated media content information can be based on the supplemental information.

As a hypothetical example, a user located in a specific territory (e.g., region and/or country) can request to watch video content via an online service. An appropriate rating schema can be determined based on the request and/or the location of the user, which may be determined based on the device utilized by the user to submit the request and/or the device in which the user is to view the video content. Mature content can be identified in the requested video, and utilized to determine a content descriptor and rating for the movie. The content descriptor and the movie rating can be utilized by the media content system to determine whether to allow or prevent (e.g., block) the user to stream the movie. Alternatively, the content descriptor and the movie rating can be provided to the user for the user to determine whether to request output of the movie.

Although the maturity rating information 108 can be transmitted to the media content management system 114 as discussed above in the current disclosure, it is not limited as such. In some examples, the maturity rating information 108 and/or the media content information 116 can be transmitted by one or more systems (e.g., the media content management system 114 and/or the maturity rating information management system 102) to one or more of the computing device(s) (e.g., server(s)) in the territories, one or more of the remote device(s), and/or one or more other systems (e.g., any third-party device(s), etc.).

Figure 2:
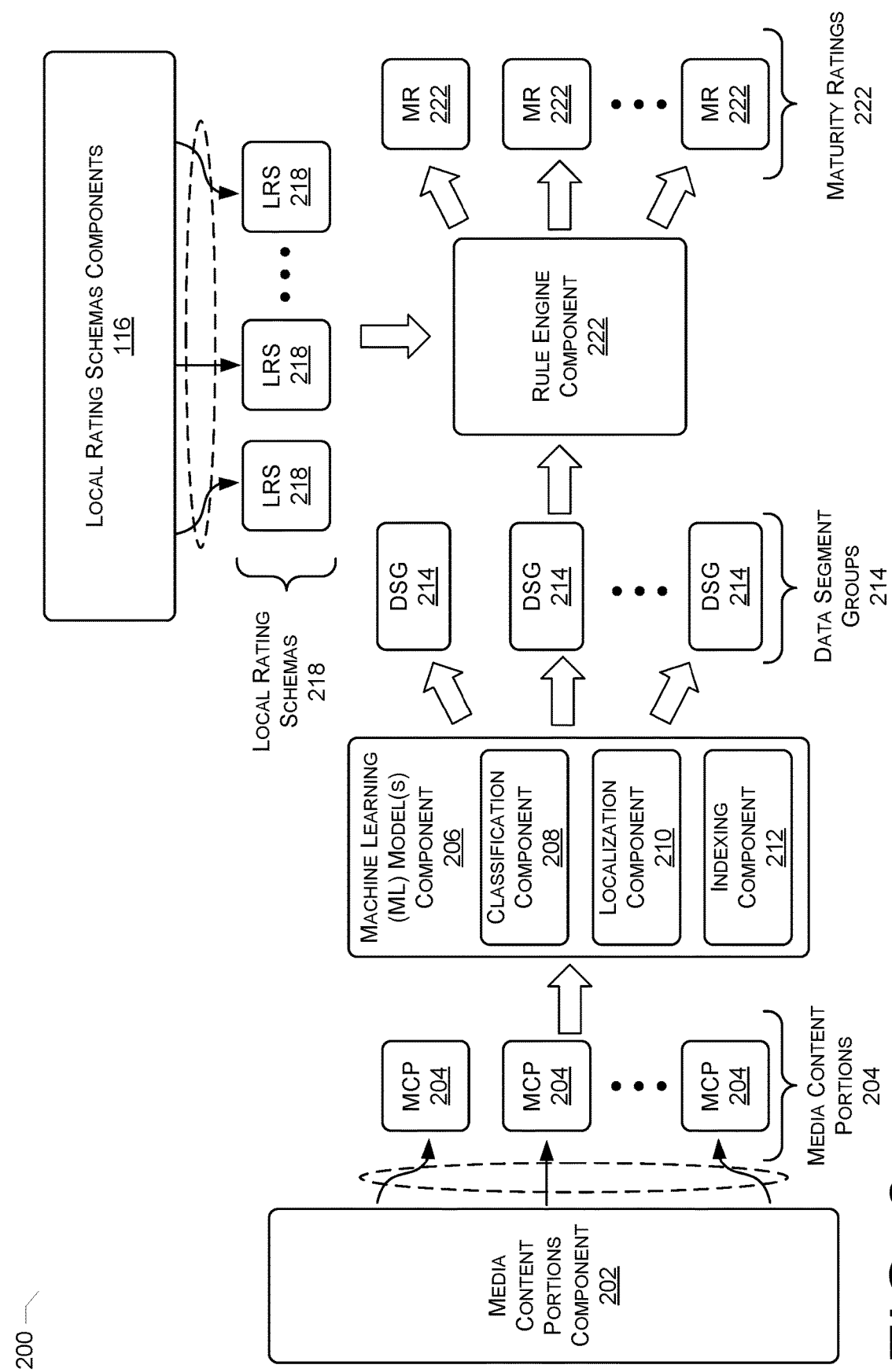
FIG. 2 is a schematic diagram of components of an age-appropriate media content ratings determination system, in accordance with some examples of the present disclosure.

FIG. 2 is a schematic diagram 200 of components of an age-appropriate media content ratings determination system, in accordance with some examples of the present disclosure. As illustrated, the age-appropriate media content ratings determination system can include a media content portion(s) component 202. The media content portion(s) component 202 can include one or more media content portions 204 (e.g., one or more media content portions 204 associated with a movie being analyzed, one or more media content portions 204 associated with a clip of a movie being analyzed, etc.). Individual ones of the media content portion(s) may be a media file or a media clip. In some examples, a media file can be a file including various types of content (e.g., movie/video content, audio content, subtitles content, metadata, etc.). In some examples, a media clip can be a portion of a media file, the portion having any duration (e.g., a full duration or a partial duration) of the media file. The media content portion(s) 204 may include any number and variety of media files and/or media clips.

Although the media content portion(s) 204 are managed by the media content portion(s) component 202 as discussed above in the current disclosure, it is not limited as such. In some examples, individual media content portion(s) 204 may be implemented, for purposes of any of the techniques as discussed herein, as one or more media files and/or one or more media clips. In those examples, the media file(s) and/or the media clip(s) may be associated (e.g., combined, integrated, and/or linked) with any number and/or type of media (e.g., video, audio, text (e.g., subtitles), etc.), and/or relevant information (e.g., metadata, etc.).

The age-appropriate media content ratings determination system can include a machine learning (ML) model(s) component 206 to process the media content portion(s) 204. The ML model(s) component 206 can be implemented as the ML model(s) component 110, as discussed above with reference to FIG. 1. The machine learning (ML) model(s) component 206 can utilize one or more ML models to process the media content portion(s) 204. Individual ones of the media content portions 204 can include one or more frames of the media content (e.g., the movie or the movie clip). A portion (e.g., a partial portion or an entire portion) of all of the media content portions 204 associated with the media content can be analyzed and utilized to determine maturity rating information (e.g., the maturity rating information 108) associated with the media content (e.g., the movie or the movie clip). In some examples, individual media content portion(s) 204 can be processed by the ML model(s) of the ML model(s) component 206, based on one or more building blocks being determined to be associated with content of one or more data segments of the media content portion(s) 204. In those examples, for instance, a media content portion 204 can be processed by the ML model(s), based on one or more building blocks being determined to be associated with media content of one or more data segments of the media content portion 204, the data segment(s) being determined, and output, as data segment(s) of a data segment group 214.

In some examples, individual ones of the building block(s) can be output as the corresponding data segment groups 214. In those or other examples, individual ones of the content of one or more data segments determined based on the corresponding building block(s) can be output as the corresponding data segment groups 214, and utilized according to any techniques discussed herein in a similar way as for the building block(s).

The machine learning (ML) model(s) component 206 can include a classification component 208 to determine classification information (or "classifications") associated with data segments in the media content portions 204. In some examples, a classification can include a type of age-sensitive media content that is represented in a data segment. In some examples, the type of age-sensitive media content can be any type from among violence-related media content, intimate-related (e.g., nudity-related, sex-related, sexually explicit-related, etc.) media content, drug-related media content, and the like.

The machine learning (ML) model(s) component 206 can include a localization component 210 to determine localization information (or "localizations") associated with data segments in the media content portions 204. In some examples, a localization can include time information indicating age-sensitive media content that is viewable via output of video content associated with a data segment. The time information can include a start time (e.g., a time stamp associated with a beginning of age-sensitive media content that is viewable via output of video content associated with a data segment) and/or an end time (e.g., a time stamp associated with an ending of age-sensitive media content that is viewable via output of video content associated with a data segment).

The machine learning (ML) model(s) component 206 can include an indexing component 212 to determine index information (or "indexes") associated with data segments in the media content portions 204. In some examples, an index can include an identifier associated with a data segment, and/or any corresponding information (e.g., a media content type, a start time, and/or an end time associated with the data segment) determined by the classification component 208 and/or the localization component 210. The index information can include any number of one or more indexes associated with the media content being analyzed to determine the maturity rating information. The index information can be utilized for full automation, or for partial automation (e.g., the index information can include identifiers of one or more of content (e.g., objects, actions, locations, etc.), descriptors, ratings, time stamps, etc.).

The machine learning (ML) model(s) component 206 can determine one or more data segment groups 214. Individual data segment group(s) 214 can include one or more data segments associated with age-sensitive media content. The data segment(s) in any of the data segment group(s) 214 can be associated with media content (e.g., video content) from which the data segment group 214 was determined (e.g., the data segment(s) of a data segment group can be associated with a same video content, such as a movie). In some examples, individual data segments of any of the data segment group(s) 214 can be implemented as any corresponding portion of information determined by the ML model(s) component 206. In those examples, for instance, a data segment of a data segment group 214 can be implemented as information including the data segment, and/or one or more classifications, one or more localizations, and/or one or more indexes associated with the data segment. In other examples, a data segment of a data segment group 214 can be combined, integrated, and/or linked with information (e.g., information in the maturity rating information 108, as discussed above with reference to FIG. 1) including the corresponding classifications, the corresponding localizations, and/or the corresponding indexes.

The age-appropriate media content ratings determination system can include one or more local rating schemas components 216. The local rating schemas component(s) 216 can transmit one or more local rating schemas 218. Individual local rating schema(s) 218 can be utilized to implement any of the local rating schema(s) 104, as discussed above with reference to FIG. 1.

The age-appropriate media content ratings determination system can include a rule engine component 220 to determine one or more maturity ratings (e.g., age-appropriate rating(s)) 222. The ML rule engine component 220 can be implemented as the rule engine component 112, as discussed above with reference to FIG. 1. The rule engine component 216 can receive the data segment group(s) 214 and the local rating schema(s) 218. The maturity rating(s) 222 can be determined based on the data segment group(s) 214 and the local rating schema(s) 218. In some examples, individual maturity rating(s) 222 can be determined based on corresponding data segment group(s) 214 and corresponding local rating schemas(s) 218. In those examples, for instance, a maturity rating 222 can be determined based on a data segment group 214 and a local rating schemas 218.

As a hypothetical example, a maturity ratings (e.g., any of the maturity rating(s) 222) of any of various types can include any ratings of a rating schema (e.g., any of the rating schema(s) 104). Various types of maturity ratings can include, for a motion picture association of America (MPAA) schema, for example, G, PG, PG-13, R, etc.

Figure 3:
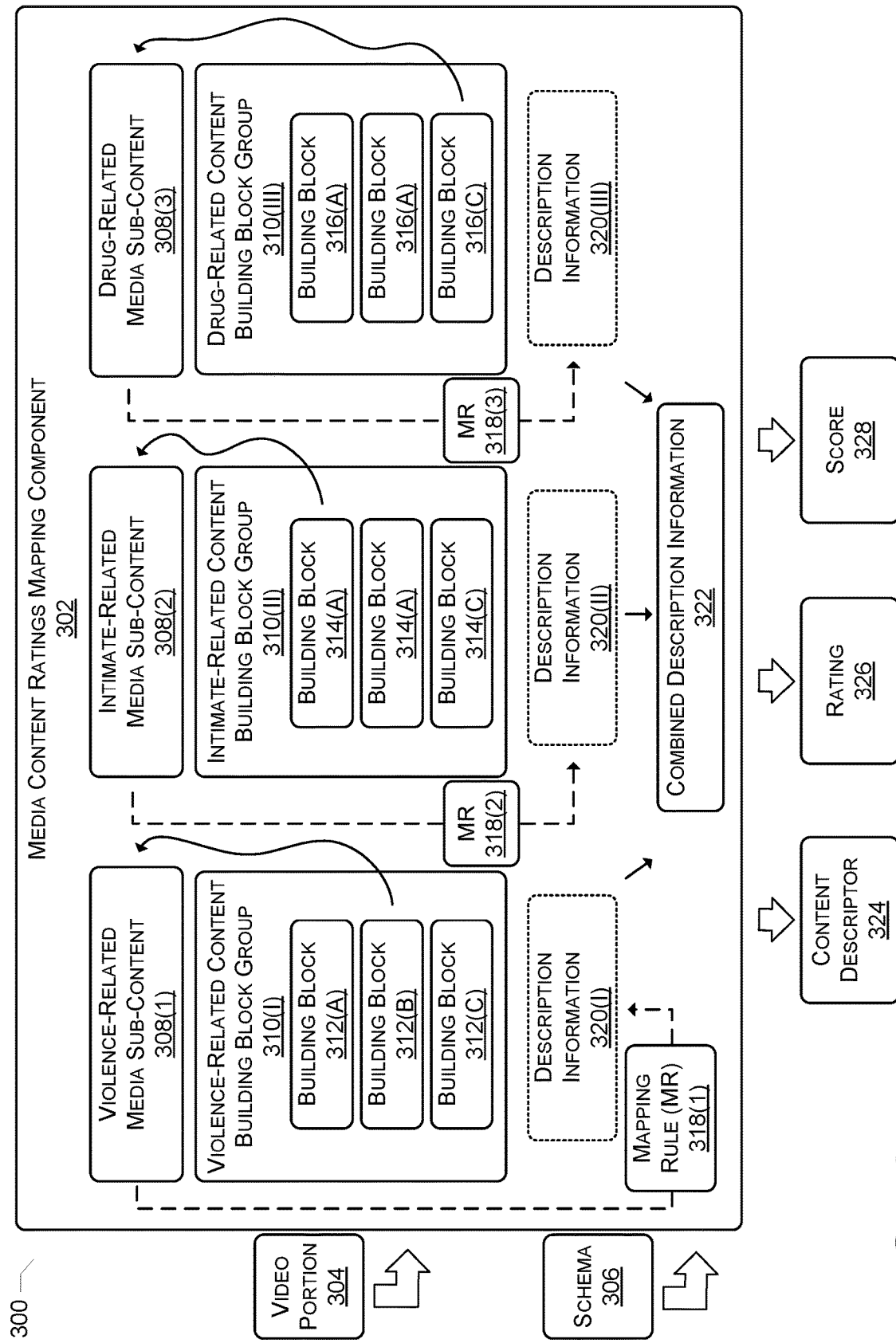
FIG. 3 is a schematic diagram of a video content mapping component in an age-appropriate media content ratings determination system, in accordance with some examples of the present disclosure.

FIG. 3 is a schematic diagram 300 of a media content ratings mapping component 302 in an age-appropriate media content ratings determination system, in accordance with some examples of the present disclosure. As illustrated, the media content ratings component 302 can receive media content, which can include a media portion (e.g., video portion) 304, and/or receive rating schema information, which can include a schema 306. The media content ratings mapping component 302 can be implemented utilizing the machine learning (ML) model(s) component 206 and/or the rule engine component 222, as discussed above with reference to FIG. 2. The video portion 304 can be implemented as any video portion (e.g., one or more video files or one or more video clips) in the unrated media content in the media content information 106, as discussed above with reference to FIG. 1. The schema 306 can be implemented as any of the local rating schema(s) 104, as discussed above with reference to FIG. 1.

The media content ratings component 302 can analyze a media portion (e.g., the video portion 304) (e.g., a movie or a movie clip), including individual groups of one or more frames of individual media content portions (e.g., any of the media content portions 204) of the video portion 304. Analysis of a portion (e.g., a partial portion or an entire portion) of the group(s) of frames of the video portion 304 can be performed individually, and then upon completion of analysis of the full video portion 304 (e.g., all frames of the video portion 304), one or more results (e.g., one more of the content descriptor 324, rating 326, and/or score 328, as discussed below) of the media content ratings component 302 can be determined.

The media content ratings component 302 can be utilized to identify various types of age-sensitive media content. In some examples, the video content mapping component 302 (e.g., one or more ML models of the ML model(s) component 206) can analyze the video portion 304, and determine and/or identify one or more frames of the video portion 304 that include various types of sub-content 308(1)-(3) (collectively referred to as media sub-content 308). The frame(s) of the video portion 304 can be identified by utilizing the schema 306. In those examples, the frame(s) can include one or more frames including violence-related media sub-content 308(1), one or more frames including intimate-related media sub-content 308(2), and/or one or more frames including drug-related media sub-content 308(3).

As a hypothetical example, any determinations of the content (e.g., sub-content) being violence-related, intimate-related, drug-related, etc., can be determined with respect to territorial values, cultural values, etc. The determinations can be made by users that provide training data to the ML model(s), based on any information (e.g., information provided by territorial organizations, governments, etc.), such as rules, guidelines, etc. Violence-related content can include, for example, content (e.g., content that is dangerous, hazardous, threatening, illegal, etc.) associated with potential or actual injury to humans, inanimate objects (e.g., buildings, property, signs, etc.), and/or animals. Intimate-related content can include, for example, content (e.g., content that includes characters engaging in sexual acts, etc.) associated with nudity, sex, and/or sexual content. Drug-related content can include, for example, content (e.g., content that includes characters engaging in usage or the sale of drugs, etc.) associated with drugs, drug paraphernalia, drug trafficking, etc.

Although types of content can include violence-related, intimate-related, drug-related content as discussed above in this disclosure, it is not limited as such. Any other type of content can be included and utilized to determine content descriptors and/or maturity ratings. In some examples, other types of content can include content associated with and/or violating one or more of legal rules, cultural norms, regional sensitivities, etc.

Although the violence-related media sub-content 308(1), the intimate-related media sub-content 308(2), and/or the drug-related media sub-content 308(3) can be identified as discussed above in the current disclosure, it is not limited as such. In some examples, any number of various types of age-sensitive sub-content can be identified in a similar way as for the media sub-content 308 and utilized to implement any of the techniques discussed herein.

The media content ratings component 302 can utilize various types of components to process the media content information in various ways. In some examples, the media content ratings component 302 can utilize the ML models (e.g., the ML model(s) in the ML model(s) component 206) to process the media content information, such as the video portion 304. The ML model(s) can include a collection of one or more groups (or "building block group(s)") of one or more segments of data (or "building block(s)") 310(I)-(III) (collectively referred to as "building block group(s) 310"). The building block group(s) 310 can be included, along with mapping rules (e.g., the mapping rules 318, as discussed below), in the ML model(s). In some examples, individual segments of data can be implemented as the corresponding building blocks. In those examples, individual ones of the segments of data (e.g., the building blocks) can be associated with one or more media content depictions (e.g., an object, an action, a location, and/or a reference characteristic).

Although individual building blocks can be associated with the object, the action, the location, and/or the reference characteristic, as discussed above in the current disclosure, it is not limited as such. In some examples, any of the building blocks can be associated with any media content depiction in a similar way and utilized to implement any of the techniques discussed herein. In alternative or additional examples, any number of building blocks associated with various types of media content depictions can be utilized to determine corresponding types of media sub-content.

The building block group(s) 310 can be associated with various types of age-sensitive media content. One or more building blocks in individual building block group(s) 310 can be associated with a same type of age-sensitive media content. The building block group(s) 310 can include a violence-related building block group 310(I), an intimate-related (e.g., nudity-related, sex-related, sexually explicit-related, etc.) building block group 31000, and/or a drug-related building block group 310(III). The violence-related building block group 310(I) can include one or more building blocks 312(A)-(C) (collectively referred to as "building block(s) 312"). The intimate-related building block group 310(11) can include one or more building blocks 314(A)-(C) (collectively referred to as "building block(s) 314"). The drug-related building block group 310(111) can include one or more building blocks 316(A)-(C) (collectively referred to as "building block(s) 316").

In some examples, the media content ratings component 302 can identify, in the video portion 304, media content depiction(s) including an action. The media content ratings component 302 can determine first movement of a first character in the video portion 304, based on a first position of the first character in a frame, and based on a second position of the first character in at least one of a previous frame or a subsequent frame of the video portion 304, with respect to the frame. The media content ratings component 302 can determine the first movement and the second movement in the video portion 304, based on determining that the first movement and the second movement in one or more frames represented by the building block 316 are in frame(s) of the video portion 304. A portion of the media content with the age-sensitive character action can be identified further based on a characteristic of movement represented by the building block 316 being similar to, or the same as, a characteristic of the movement of the character in the video portion 304. The characteristic (e.g., speed) of movement represented by the building block 316 can be determined as being similar to, or the same as, a characteristic of the movement of the character in the video portion 304 based on value of the characteristic being less than a threshold characteristic value. Any other type of content can be utilized along with the characteristic of movement, such as audio (e.g., sound) associated with the characteristic of movement to identify the age-sensitive character action.

As a hypothetical example, movement of a character can be identified in a frame, such as a character in the act of punching another character. Because a first could be involved in various types of movement, more than one frame can be analyzed to determine whether the first is being used to throw a punch. The previous frame can be utilized to determine information about movement of the first, based on the relative location of the first, the distance in which the first travels, the time between the frames, the direction in which the first is moving, etc. A building block can include a segment of data that includes information used to control pixels that output a portion (e.g., a partial portion or an entire portion) of an image represent the first, the character throwing the punch, the character being impacted by the punch, etc., for each of any number of frames. The segments of data for the respective frames can be captured as the building block.

One or more modifications can be made to a number and/or type of building block groups, and/or to a number and/or type of building blocks in any of the building block groups. By way of example, one or more additional building blocks 312 can be added to the building block group 310, or any of the building blocks 312 can be remove from the building block group 310. Additionally or alternatively, the modification(s) can including one or more modifications to a number and/or type of the mapping rule(s). Mapping rule modifications can include a type and/or content of the mapping rule, and/or the description information 320 with which the mapping rule is associated. The modifications to the building block group(s), the building block(s), and/or the mapping rule(s) can be made dynamically (e.g., the modifications can be made in real-time) based on any changes to any information (e.g., the schema 306) input to the media content ratings mapping component.

Although the description information 320 can be determined and utilized to determine the combined description information 322, as discussed above in the current disclosure, it is not limited as such. In some examples, the description information 320 without the combined description information 322, or the combined description information 322 without the description information 320, can be determined and utilized to determine the content descriptor 324, the rating 326, and/or the score 328. In some examples, the content descriptor 324, the rating 326, and/or the score 328 can be determined in a similar way as for the description information 320 and/or the combined description information 322, but without separately determining the description information 320 and/or the combined description information 322.

Although individual building block groups can be associated with different corresponding types of age-sensitive media content, as discussed above in the current disclosure, it is not limited as such. In some examples, any building block group can be associated with one or more types of media content and can include one or more building blocks associated with individual ones of the corresponding media content types. Although the violence-related building block group 310(I) can include the building block(s) 312(A)-(C), the intimate-related building block group 31000 can include the building block(s) 314(A)-(C), and the drug-related building block group 310(III) can include the building block(s) 316(A)-(C), as discussed above in the current disclosure, it is not limited as such. In some examples, individual ones of the building block group(s) 310 can include any number of building blocks of any type (e.g., any number of building blocks that are individually associated with any number of one or more types of media content depictions).

The media content ratings component 302 can utilize the building block group(s) 310 to identify and/or detect the media sub-content 308 in the video portion 304. For instance, with the violence-related content building block group 310(I) as an example, the media content ratings component 302 can determine the violence-related media sub-content 308(a) includes one or more characteristics of age-sensitive content represented by the building block 312(B). In some examples, the determining of the violence-related media sub-content 308(a) that includes the characteristic(s) can include analyzing one or more portions (e.g., portion(s) of sub-content) of the video portion 304. The portion(s) of the video portion 304 can be analyzed with, and/or compared to, individual ones of the building block(s) 312 (e.g., individual age-sensitive content represented by the corresponding building block(s) 312). In one instance, a portion of sub-content, such as the violence-related media sub-content 308(1), can be detected and/or identified based on individual characteristic(s) of the violence-related media sub-content 308(1) matching, and/or being the same as, the corresponding characteristic(s) of the age-sensitive content represented by the building block 312(B) (e.g., a characteristic of the violence-related media sub-content 308(1) can be determined to match a characteristic of the age-sensitive content represented by the building block 312(B)).

Various characteristics of the building blocks of various media content types associated with depictions of various types can be utilized to identify the media sub-content from the video portion 304. In some examples, for instance with a building block that is associated with an object (e.g., a gun, a piece of lingerie, or a cigarette, respectively corresponding to violence-related media sub-content, intimate-related media sub-content, and drug-related media sub-content), characteristic(s) of individual ones of the building block(s) 312, 314, and/or 316 that are utilized to detect the media sub-content can include one or more characteristic(s) of an object. By way of example, and without limitation, the characteristic(s) can include a color, a size, a shape, a brand label, etc.

In some examples, for instance, with a building block that is associated with an action (e.g., punches being thrown by characters, kissing between characters, or inhaling a cigarette, respectively corresponding to violence-related media sub-content, intimate-related media sub-content, and drug-related media sub-content), characteristic(s) of individual ones of the building block(s) 312, 314, and/or 316 that are utilized to detect the media sub-content can include one or more characteristic(s) of an object. By way of example, and without limitation, the characteristic(s) can include direction of movement, rapidity of movement, length of time associated with movement, etc.

In some examples, for instance, with a building block that is associated with a location (e.g., a boxing gym, a bedroom, or a bar, respectively corresponding to violence-related media sub-content, intimate-related media sub-content, and drug-related media sub-content), characteristic(s) of individual ones of the building block(s) 312, 314, and/or 316 that are utilized to detect the media sub-content can include one or more characteristic(s) of an object. By way of example, and without limitation, the characteristic(s) can include a shape of a room, objects in a room, etc.

In some examples, for instance, with a building block that is associated with a reference characteristic (e.g., blood, a sound of characters kissing, or smoke from a cigarette, respectively corresponding to violence-related media sub-content, intimate-related media sub-content, and drug-related media sub-content), characteristic(s) of individual ones of the building block(s) 312, 314, and/or 316 that are utilized to detect the media sub-content can include one or more characteristic(s) of an object. By way of example, and without limitation, the characteristic(s) can include an amount of time between depiction of the reference characteristic and other depictions that are potentially age-sensitive, a time duration during which the reference characteristic is viewable, etc.

The media content ratings component 302 can utilize one or more mapping rules 318(1)-(3) (collectively mapping rules 318) to determine one or more corresponding portions of description information 320(I)-(III) (collectively referred to as description information 320). The description information 320 can include content descriptor information (e.g., information including content descriptors). Content descriptor information, including a content descriptor, associated with the building block 312(B) can be determined as a content descriptor in the description information 312(I). The content descriptor associated with the building block 312(B) can be determined based on the schema 306 and the building block 312(B).

In some examples, for instance, with the violence related media sub-content 308(1) being identified, the mapping rule 318(1) can be utilized to determine the description information 320(I) associated with the violence related media sub-content 308(1). Individual mapping rule(s) 318 can include one or more of a legal rule, a cultural norm rule, and a regional sensitivity rule. The legal regulation or guideline can include data indicating the age-sensitive media content is proscribed by a government of the country, the cultural norm guideline including data indicating the age-sensitive media content is contrary to beliefs or viewpoints held by a percentage of people that identify themselves as being associated with a demographic. The demographic can include at least one of an age range, a race or ethnicity, a nationality, a religion, a philosophy, a family status or history, an income or economic status, a political affiliation, an occupation, a sexual orientation or identity, a pastime, or a social sphere. The regional sensitivity guideline can include data indicating the age-sensitive media content is contrary to local beliefs or viewpoints held by a percentage of people located in the country.

Although the mapping rule(s) 318 including the legal rule, the cultural norm rule, and/or the regional sensitivity rule are utilized to identify the descriptor information 320 as discussed above in the current disclosure, it is not limited as such. In some examples, individual ones of the building blocks 312 can be mapped to the corresponding sub-content 308 based on the legal rule, the cultural norm rule, and/or the regional sensitivity rule. As legal rules, cultural norm rules, and/or regional sensitivity rules change, any of the building block mappings and/or any of the results (e.g., one or more of the content descriptor(s), the rating(s), the score(s), etc.) of the media content ratings mapping component 302 can be updated on a continual basis (e.g., in real-time or near real-time (e.g., within any amount of time, such as 1 millisecond, 1 second, 10 seconds, 1 minute, 1 hour, etc.)). Any updates can be performed automatically and/or based on commands from users (e.g., commands received from content server(s) and/or user devices). Automatic updates can be performed based on the media content ratings component 302 monitoring any system associated with the legal rules, the cultural norm rules, and/or the regional sensitivity rules.

In some examples, changes to building block mappings and/or media content ratings mapping component results can be performed to improve accuracy of the building block mappings and/or media content ratings mapping component results. Alternatively or additionally, changes to building block mappings and/or media content ratings mapping component results can to be performed to accurately align the building block mappings and/or media content ratings mapping component results with the modified legal rules, the modified cultural norm rules, and/or the modified regional sensitivity rules.

Although the content descriptor(s), the rating(s), the score (s), etc.) of the media content ratings mapping component 302 can be determined by corresponding mapping rules 318 in the current disclosure it is not limited as such. In some examples, the media content ratings mapping component 302 can utilize one or more of the mapping rules 318 utilized to determine the results (e.g., one or more of the descriptor information 320, the combined descriptor information 322, the content descriptor(s) 324, the rating(s) 326, the score(s) 328, etc.) of the media content ratings mapping component 302, and/or of one or more mapping rules (e.g., other mapping rule(s)) utilized to map corresponding building blocks to the corresponding media sub-content 308. The other mapping rule(s) can be utilized to map corresponding building blocks to the corresponding media sub-content 308 based on the legal rules, the cultural norm rules, and/or the regional sensitivity rules.

Content descriptors and building blocks utilized to determine the content descriptors can vary based on the schema 306. For example, a content descriptor associated with one or more building block(s) based on the schema 306 can be the same as, or different from, a content descriptor for the same, or different, building block(s) based on another schema 306. A portion (e.g., a partial portion or an entire portion) of the building block(s) associated with the content descriptor based on the schema 306 can be the same as, or different from, a portion (e.g., a partial portion or an entire portion) of other building block(s) associated with the same, or different, content descriptor based on the other schema.

Various combinations of building blocks in a building block group can be utilized to determine description information. By way of example, the description information 320(I) can include a content descriptor determined based on one or more of the building block(s). The content descriptor of the description information 320(I) can include individual ones of any number of content descriptors associated with individual ones of the corresponding building blocks 312, or some amalgamation thereof.

In a hypothetical example, schema information associated with Singapore can result in a "violence" content descriptor being associated with violence related media sub-content of a video file that includes bloody entrails. The "violence" content descriptor can be included in the description information based on a building block associated with a bloody entrails being utilized to identify the violence related media sub-content. However, schema information associated with other territories might result in the "violence" content descriptor not being included in the description information.

In a hypothetical example, schema information associated with the United States can result in a "extreme violence" content descriptor being associated with a video file for which violent content associated with a large number of building blocks is identified. Whereas, schema information associated with another country can result in a "violence" content descriptor being associated with the same video file, based on different sub-content descriptors being associated, via the schema information, with the same building blocks.

The media content ratings component 302 can determine combined description information 322 based on the description information 322. In some examples, the combined description information 322 can include a content descriptor based on a combination of the content descriptors (or "content sub-descriptors") of the description information 320.

The media content ratings component 302 can be utilized to determine and manage various types of maturity rating information, and/or various types of media content rated therewith. The media content ratings component 302 can determine maturity rating information (e.g., the maturity rating information 108, as discussed above with reference to FIG. 1), which can include a content descriptor 324 and/or a rating 326, and/or rated media content information (e.g., the rated media content in the media content information 116, as discussed above with reference to FIG. 1). The rating 326 can be implemented as any of the maturity ratings (e.g., age-appropriate rating(s)) 222, as discussed above with reference to FIG. 2.

The media content ratings component 302 can determine a score 328. The score 328 can indicate a confidence level of the content descriptor 324 and/or the rating 326. The score 328 can be utilized as a flag to indicate manual review (or "manual inspection") of the video portion 304. Any of the information (e.g., the media-sub content 308, the mapping rules 318, the description information 320, the combined description information 322, etc.) determined by the media content ratings component 302 for the video portion 304 can be included, and/or integrated, with the score 328. The information included with the score 328 can be utilized by the user for manually reviewing the video portion 304. The score 328 can trigger manual inspection of the video portion 304. Adjustments can be made to the content descriptor 324 and/or the rating 326 based on a result of the manual review, such as by utilizing the operator labeling user interface (UI), as discussed below with reference to FIGA. 6A and 6B.

Any of the information determined and/or output by the media content ratings mapping component 302 can be included as part of the maturity rating information 108 and/or the media content information 116 in a variety of ways. In some examples, the determined and/or output information (e.g., the content descriptor 324, the rating 326, and/or the score 328) can be included as part of metadata associated with the corresponding rated media content in the media content information 116.

Figure 4:
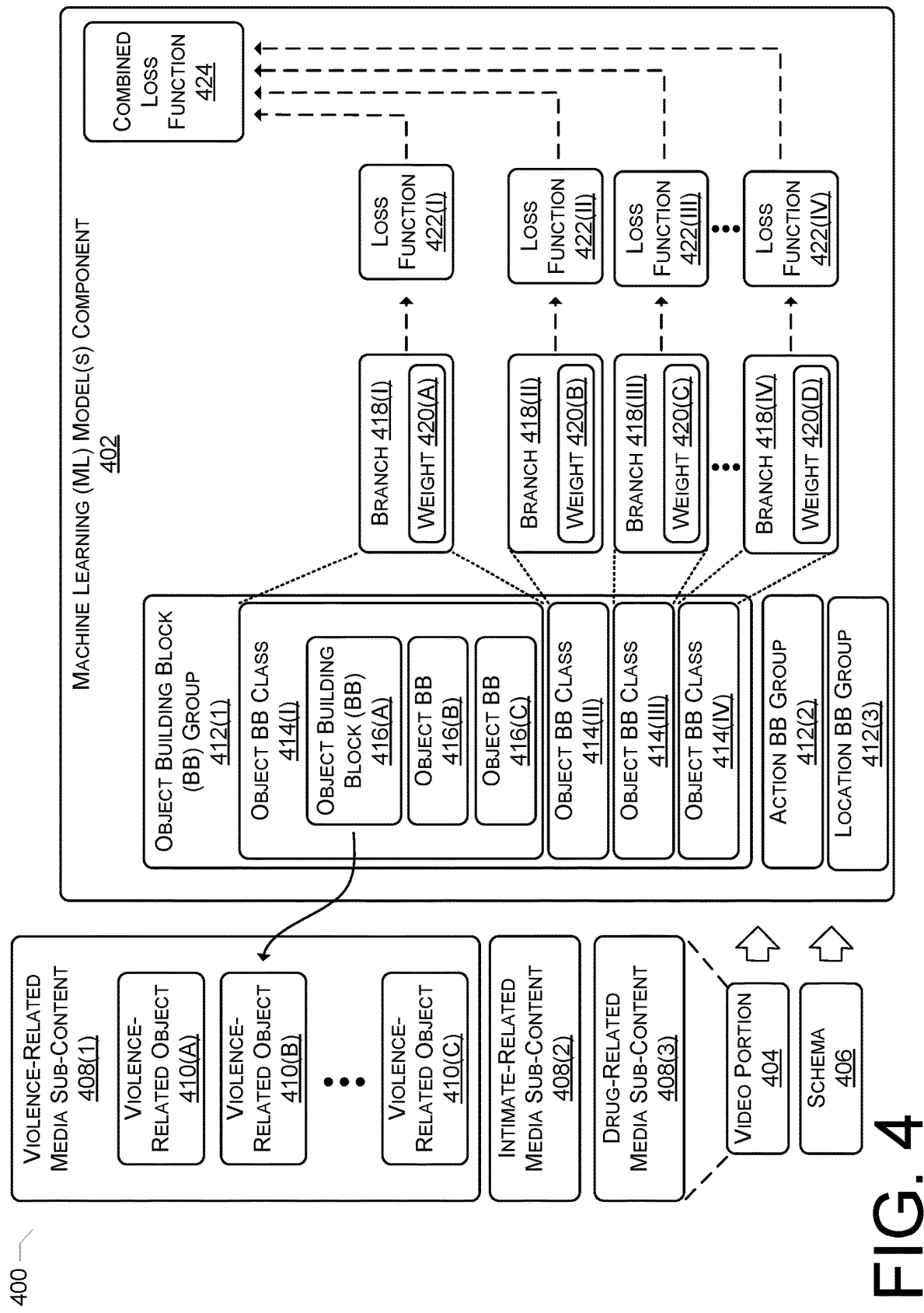
FIG. 4 is a schematic diagram of a machine-learning (ML) model(s) component usable in an age-appropriate media content ratings determination system, in accordance with some examples of the present disclosure.

FIG. 4 is a schematic diagram 400 of a machine-learning (ML) model(s) component usable in an age-appropriate media content ratings determination system, in accordance with some examples of the present disclosure. As illustrated, the age-appropriate media content ratings determination system includes an ML model(s) component 402 with one or more ML models. The ML model(s) in the ML model(s) component 402 can be utilized to implement one or more of the ML model(s) in the media content ratings mapping component 302, as discussed above with reference to FIG. 3.

The ML model(s) component 402 can receive unrated media content (e.g., the unrated media content in the media content information 106, as discussed above with reference to FIG. 1) and local rating schemas (e.g., the local rating schemas 104, as discussed above with reference to FIG. 1). The local rating schemas can include a schema 406, which can be implemented as the schema 306, as discussed above with reference to FIG. 3). The unrated media content in the media content information 106 can include a video portion 404, which can be implemented as the video portion 304, as discussed above with reference to FIG. 3).

The ML model(s) component 402 can be utilized to process the video portion 404. The ML model(s) component 402 can analyze the video portion 404, and determine and/or identify one or more frames of the video portion 404, which can include one or more media sub-content 408(1)-408(3) (collectively referred to as "media sub-content 408"). The media sub-content 408 can include violence-related media sub-content 408(1), intimate-related media sub-content 408 (1), and/or drug-related media sub-content 408(1). In some examples, the media sub-content 408 can be implemented as the media sub-content 308, respectively, as discussed above with reference to FIG. 3. The ML model(s) component 402 can determine and/or identify one or more depictions (e.g., objects, actions, etc.) of individual ones of the media sub-content 408. By way of example, depiction(s) of the violence-related media sub-content 408(1) can include one or more violence-related objects 410(A)-410(C) (collectively referred to as "violence-related objects 410").

The ML model(s) component 402 can include one or more building block groups 412(1)-(3) (collectively referred to as "building block group(s) 412") utilized to determine and/or identify the depiction(s) of individual ones of the media sub-content 408. In some examples, any of the building block group(s) 412 can be utilized to implement any of one or more the building block group(s) 310, respectively, as discussed above with reference to FIG. 3. For instance, with examples in which the building block group(s) 412 include the object building block group 412(1), the object building block group 412(1) can be utilized to implement the violence-related content building block group 310(I) (e.g., a group with violence-related object building blocks). Any number and/or type of the building block group(s) 412 can be included in any of the building block group(s) 310s (e.g., one or more object building block group(s) can be included in the violence-related content building block group 310(0).

Although the violence-related media sub-content 408(1), the intimate-related media sub-content 408(2), and/or the drug-related media sub-content 408 (3) can be identified as discussed above in the current disclosure, it is not limited as such. In some examples, any number of various types of age-sensitive sub-content can be identified in a similar way as for the media sub-content 408 and utilized to implement any of the techniques discussed herein. Although the violence-related media sub-content 408(1) can include the violence-related objects 410, as discussed above in the current disclosure, it is not limited as such. In some examples, any of the violence-related media sub-content 408(1) can include any number of the violence-related objects. In a similar way, any other type of media sub-content 408 (e.g., the intimate-related media sub-content 408(1), the drug-related media sub-content 408(1), etc.) can include any number of depictions, which can be processed by the ML model(s) component 402 in a similar way as for the violence-related objects 410.

The ML model(s) component 402 can include, in individual building block group(s) 412, one or more building block classes (e.g., object building block class(es) 414). By way of example, the object building block group 412 can include one or more object building block classes 414(I)-(IV) (collectively referred to as the "object building block class(es) 414"). Individual building block group(s) 412 can include one or more building blocks, any of which can be implemented as any of the building block(s) 314, as discussed above with reference to FIG. 3. By way of example, the object building block class 414(I) can include one or more object building blocks 416(A)-(C) (collectively referred to as "object building block(s) 416").

The building block class(es) 414 can be utilized to organize (e.g., classify) the building blocks 416. By way of example, the object building blocks 416(A)-(C) can be included in object building block class 414(I) based on the object building blocks 416 being associated with a same object (e.g., a gun that is being depicted in different circumstances (e.g., different rooms, lighting amounts, perspectives, sizes, etc.)). Various levels of classification can be utilized to organize the building blocks 416(A)-(C) into the object building block class 414. By way of example, the object building blocks 416(A)-(C) can be included in object building block class 414(I) based on the object building blocks 416 being associated with a same object of a same type (e.g., a "Walther PPK" that is depicted in different circumstances (e.g., different rooms, lighting amounts, perspectives, sizes, etc.)).

Although the object building block group 412(1) includes the object building block class(es) 414(A)-(C) as discussed above in the current disclosure, it is not limited as such. In some examples, any of the building block groups can include any number of building block classes. Although the object building block class 414(A) includes the object building block 416 as discussed above in the current disclosure, it is not limited as such. In some examples, any of the building block class(es) 414 of any type can include any number of building blocks.

The ML model(s) component 402 can process any of the building blocks 416 in any of the building block group(s) 412, and/or in any of the building block classes 414, utilizing one or more branches 418. By way of example, one or more branches 418(I)-(IV) (collectively referred to as "branch(es) 418") can be utilized to process the object building block class(es) 414, respectively.

The ML model(s) component 402 can utilize weights 420 associated with the branches 418 to process the video portion 404. The building blocks 416 can be processed using one or more weights 420(A)-(D) (collectively referred to as "weight(s) 420"). By way of example, individual ones of the weight(s) 420 can be associated with any of the building block group(s) 412, any of the building block class(es) 414, and/or any of the building blocks 416.

The weight(s) 420 can be utilized to indicate corresponding levels of importance of the building block(s) 416, to optimize processing of the ML model(s) component 402. In some examples, the weight(s) 420 can be utilized to process the building block(s) 416, to emphasize processing of any of the building block group(s) 412, any of the building block class(es) 414, and/or any of the building blocks 416 based on the corresponding weight(s) 420 having a higher value (e.g., a weight value that is greater than or equal to a threshold weight). The weight(s) 420 can be utilized to process the building block(s) 416, to deemphasize processing of any of the building block group(s) 412, any of the building block class(es) 414, and/or any of the building blocks 416 based on the corresponding weight(s) 420 having a relatively lower value (e.g., a weight value that is less than a threshold weight).

The ML model(s) component 402 can utilize one or more loss functions 422(I)-422(IV) (collectively referred to as "loss function(s) 422") to process the video portion 404. Individual loss function(s) 422 can be utilized to process building blocks 416 of corresponding building block group(s) 412 and/or corresponding building block class(es) 416. By way of example, the loss function 422(I) can be utilized to process building blocks 416 of the building block group 412(1) and/or the building block class 416(I).

The loss function(s) 422 can indicate whether the video portion 404 has age-sensitive media content. The loss function(s) 422 can be utilized to determine (e.g., calculate) a corresponding value indicating whether the building block(s) 416 in the corresponding building block group 412 and/or the corresponding building block class 416 are represent age-sensitive media content. By way of example, the corresponding values determined utilizing the loss function(s) 422 can determine a confidence level (or "confidence value") that the building block(s) 416 in the corresponding building block group 412 and/or the corresponding building block class 416 represent age-sensitive media content.

In some examples, individual building block groups 412, individual object classes 414, individual branches 418, and/or individual loss functions 422 can be implemented in corresponding ML models. By way of example, the ML model(s) component 402 can include a single ML model that includes one of the building block groups 412, one of the object classes 414, one of the individual branches 418, and/or one of the loss functions 422. In other examples, any number and/or type of the building block groups 412, any number and/or type of individual object classes 414, any number and/or type of individual branches 418, and/or any number and/or type of individual loss functions 422 can be implemented in one or more ML models (e.g., one ML model, multiple ML models, etc.). By way of example, the ML model(s) component 402 can include all of the building block groups 412, all of the individual object classes 414, all of the individual branches 418, and/or all of the loss functions 422. In some examples in which any of more than one ML model includes any number of the building block groups 412, the ML models can be utilized together to perform any of the techniques as discussed herein for the ML model(s) component 402.

By adjusting a number of ML models and the types of data being processed by the ML models, accuracy and processing time of the ML models can be adjusted. A single ML model being utilized simplifies programming and complexity of the ML model(s) component 402. Different ML models being utilized for different types of data (e.g., an ML model for object building blocks) increases accuracy of the ML models, but also increases complexity of the ML model(s) component 402. The number and types of ML models can be modified on an ongoing, continuing, basis in real-time, including at times during which a portion (e.g., an entire portion or a partial portion) of the ML model(s) component 402 are in use, and/or or at times during which the ML model(s) component 402 is not in use.

The ML model(s) component 402 can include a combined loss function 424 to receive the corresponding values determined based on the loss function(s) 422. The combined loss function 424 can determine a combined value of the corresponding values determined based on the loss function(s) 422. The combined value determined by the combined loss function 424 can indicate whether the video portion 404 has age-sensitive media content. In some examples, the combined value determined by the combined loss function 424 can indicate a confidence level that the video portion 404 has age-sensitive media content.

Although the object building block(s) 416 are processed by the ML model(s) component 402, utilizing the branches 418, the weights 420, and the loss functions 422, as discussed above in the current disclosure, it is not limited as such. Any number and/or types of building blocks can be processed in a similar way as for the object building blocks 416.

Any of the ML model(s) in the ML model(s) component 402 can be trained. The ML model(s) in the ML model(s) component 402 that are trained may be referred to as trained ML model(s). Although the term "ML model(s)" is utilized throughout this disclosure, it is not limited as such. Any of the techniques discussed throughout this disclosure can be interpreted with the ML model(s) being trained ML model(s). The ML model(s) can be trained by utilizing any information/data (e.g., local rating schemas 104, unrated media content in the media content information 106, maturity rating information 108, etc.) utilized by the ML model(s), as discussed throughout this disclosure. In some examples, the ML model(s) can be trained by users (e.g., operators), via the remote devices 702. Training can continue on an ongoing, continuing, basis in real-time, including at times during which a portion (e.g., an entire portion or a partial portion) of the ML model(s) component 402 are in use, and/or or at times during which the ML model(s) component 402 is not in use.

Automation of the ML model(s) can be performed based on ratings (e.g., ground truth ratings) utilized to train the ML model(s). The ratings provided for the training can be received via manual input utilized to associate the ratings with the portions of the media content. For full automation, operation of the ML model(s) can be performed based on information associated with comparisons between predicted ratings of the ML model(s) to manually input ratings, and the media content can be trained to perform the full automation (e.g., determination of ratings without manual input). For partial automation, operation of the ML model(s) can be performed based on information associated with comparison between the predicted ratings and the content associated with a relatively high severity level of age-sensitive content. Offline metrics utilized to improve operation of the ML model(s) can include a level of coverage (e.g., a number of titles processed by the ML model(s)), and a level of accuracy (e.g., a level of accuracy of predictions/results of ratings determined by the ML model(s)). Online metrics utilized to determined performance the ML model(s) during operation can include measurements of performance accuracy of the ML model(s) over time. The measurements can be performed with an auditing mechanism (e.g., a mechanism in the ML model(s) component 402 or any other system or component) to regularly check the accuracy of the ML model(s).

One or more modifications can be made to a number and/or type of building block groups, and/or to a number and/or type of building blocks in any of the building block groups. By way of example, one or more additional building blocks 416 can be added to the building block class 414(I) and/or the building block group 412(1), or any of the building blocks 416 can be removed from the building block class 414(1) and/or the building block group 412(1). The adding of the building blocks can be utilized to expand (e.g., increase in size) the building block class(es) 414 and/or the building block group(s) 412. The removing of the building blocks can be utilized to contract (e.g., decrease in size) the building block class(es) 414 and/or the building block group(s) 412. By way of example, additional building blocks can be added to, or removed from, the building block class 414(I) and/or the building block group 412(1) that is initially included in the ML model(s) component 402 at completion of training (e.g., initial training) of the ML model(s) in the ML model(s) component 402. Additionally or alternatively, the modification(s) can including one or more modifications to a number and/or type of the branch(es) 418, the weight(s) 420, the loss function(s) 422, and/or the combined loss function 424. The modifications can be made dynamically (e.g., the modifications can be made in real-time) based on any changes to any information (e.g., schemas, including the schema 406) input to the ML model(s) component 402. The modifications can be made based on measurements of performance of the ML model(s), and/or based on rating schemas being added or removed.

Figure 5A:
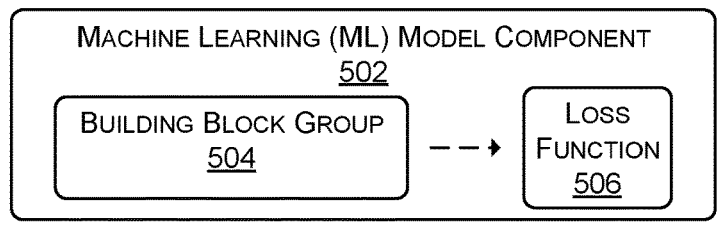
FIGS. 5A-5D are schematic diagrams of machine-learning (ML) model(s) components of various types usable in an age-appropriate media content ratings determination system, in accordance with some examples of the present disclosure.

FIGS. 5A-5D are schematic diagrams of machine-learning (ML) model(s) components of various types usable in an age-appropriate media content ratings determination system, in accordance with some examples of the present disclosure. As illustrated in FIG. 5A, a machine learning (ML) model component 502 includes an ML model that utilizes a building block group 504 and a loss function 506 to determine maturity rating information (e.g., the maturity rating information 108, as discussed above with reference to FIG. 1) associated with one or more portions of media content.

The building block group 504 can be utilized to implement one or more of the building block group(s) 412, as discussed above with reference to FIG. 4. By way of example, the building block group 504 can include, as a single building block group, one or more of the building blocks 416. The loss function 506 can be utilized to implement the loss function(s) 422 and/or the loss function 424, as discussed above with reference to FIG. 4. By way of example, the loss function 506 can be utilized to process, as a single loss function, one or more of the branch(es) 418.

Figure 5B:
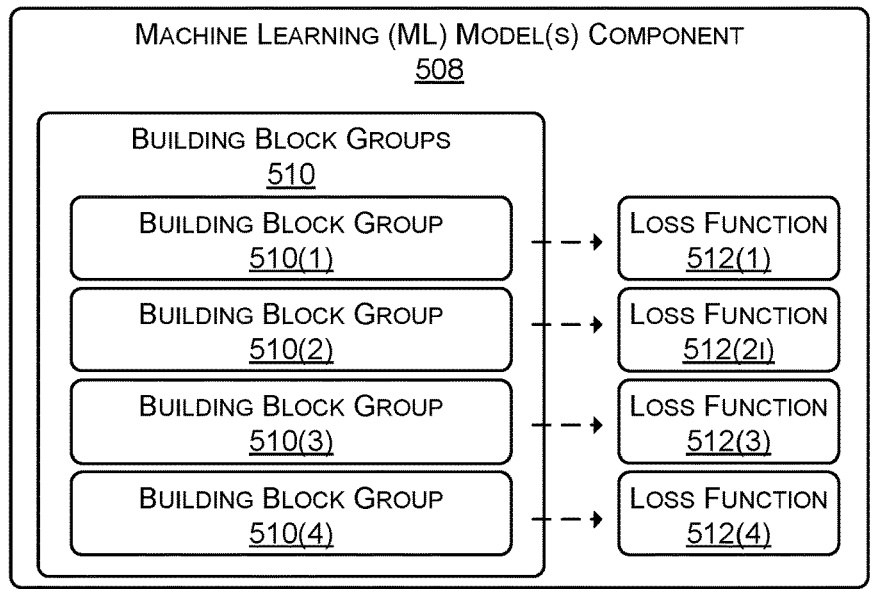

As illustrated in FIG. 5B, a machine learning (ML) model(s) component 508 includes one or more ML models that utilize one or more building block groups 510(1)-(4) (collected referred to as building blocks group(s) 510), and one or more loss functions 512(1)-(4), to determine one or more portion of media content that are age-sensitive. The building block group(s) 510 can be utilized to implement the building block group(s) 412, respectively, as discussed above with reference to FIG. 4. The loss function(s) 512 can be utilized to implement the loss function(s) 422, respectively, as discussed above with reference to FIG. 4. In some examples, individual building block group(s) 510 can be associated with corresponding loss function(s) 512. In those examples, a number of the building block group(s) 510 can be the same as a number of the loss function(s) 512.

Although the number of the building block group(s) 510 can be the same as a number of the loss function(s) 512, as discussed above in this disclosure, it is not limited as such. In some examples, any of the building block group(s) 510 (e.g., any number of building blocks in the building block group 510(1)) can be processed by utilizing one or more of the loss function(s) 512. In some examples, one or more of the building block group(s) 510 (e.g., any number of building blocks in one or more of the building block group 510(1)) can be processed by utilizing any of the loss function(s) 512 (e.g., the loss function 512(1)).

Figure 5C:
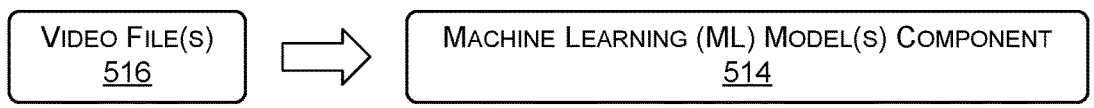

As illustrated in FIG. 5C, a machine learning (ML) model(s) component 514 includes one or more ML models that determine maturity rating information associated with one or more video files 516 (e.g., the video portion 404, as discussed above with reference to FIG. 4). In some examples, the ML model(s) component 514 can include one or more ML models implemented as the ML model(s) component 402, the ML model component 502, and/or one or more ML models implemented as the ML model(s) component 508.

Figure 5D:
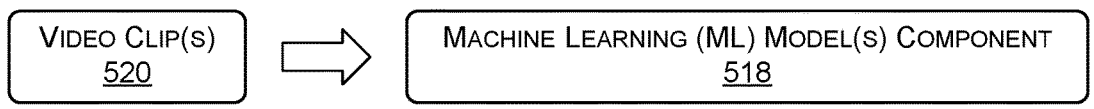

As illustrated in FIG. 5D, a machine learning (ML) model(s) component 518 includes one or more ML models that determine maturity rating information associated with one or more video clips 520 (e.g., the video portion 404, as discussed above with reference to FIG. 4). In some examples, the ML model(s) component 518 can include one or more ML models implemented as the ML model(s) component 402, the ML model component 502, and/or one or more ML models implemented as the ML model(s) component 508. Individual ones of the video clip(s) 520 can be processed in a similar way as for any of the video file(s) 516.

Figure 6A:
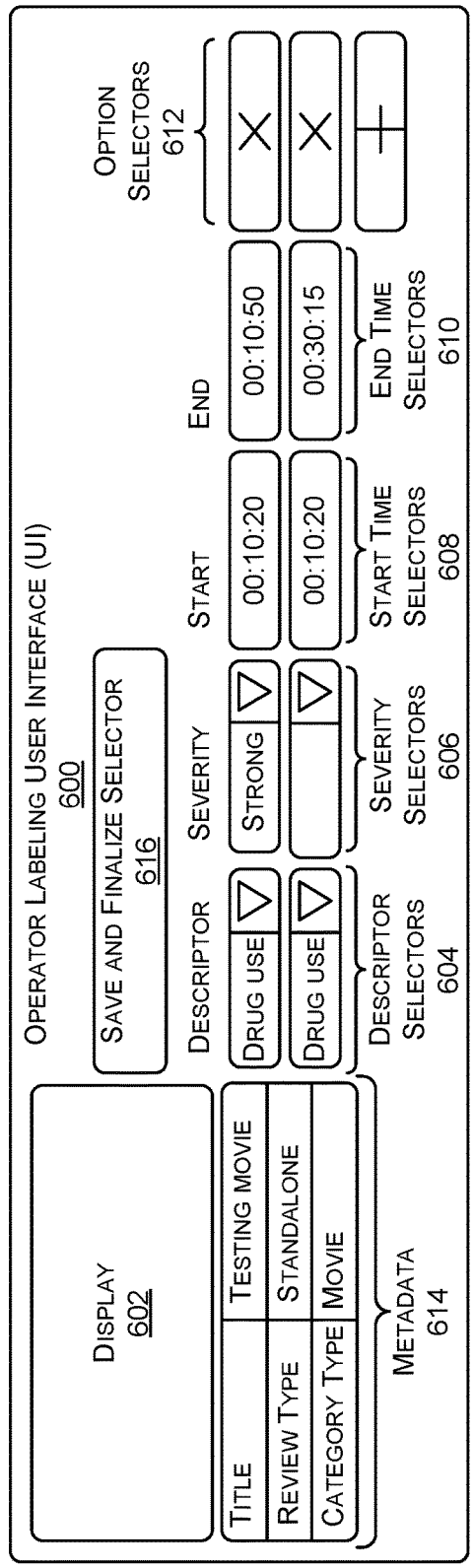
FIGS. 6A and 6B illustrate example operator labeling user interfaces (UIs) of an age-appropriate media content ratings determination system, in accordance with some examples of the present disclosure.
Figure 6B:
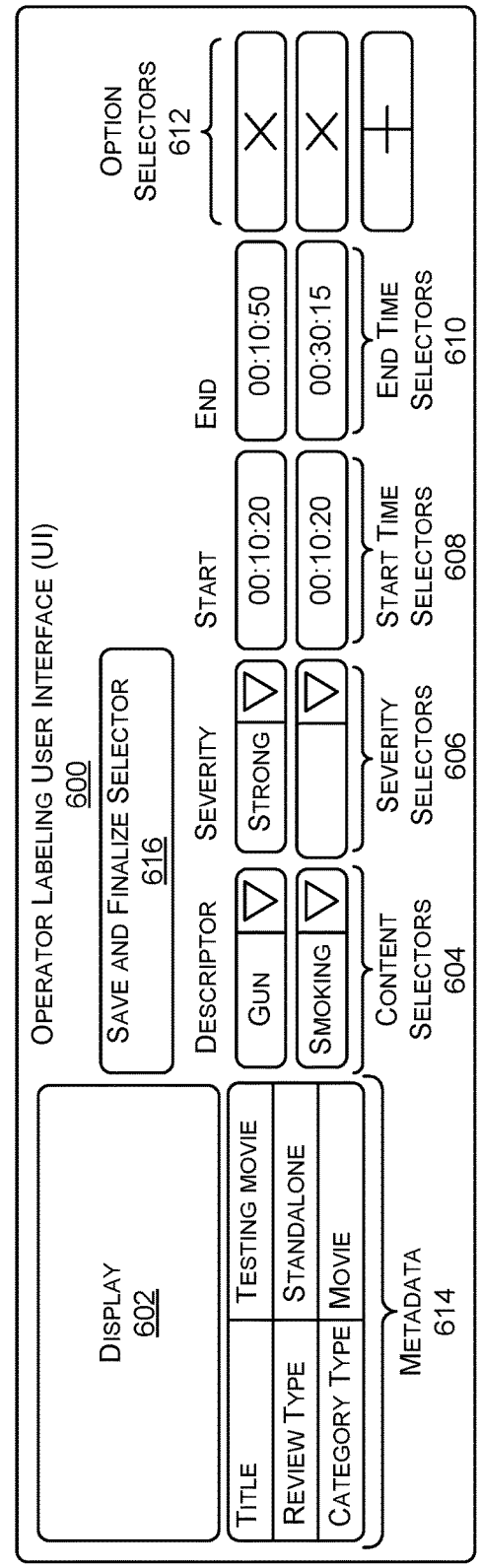

FIGS. 6A and 6B illustrate example operator labeling user interfaces (UIs) of an age-appropriate media content ratings determination system, in accordance with some examples of the present disclosure. As illustrated in FIG. 6A, in some examples, an operator labeling UI 600 can be implemented as a display interface (e.g., the display interface 722 of the user device 702, as discussed below with reference to FIG. 7). The operator labeling UI 600 can be utilized by a user to review and adjust (e.g., modify) information (e.g., the maturity rating information 108 and/or the rated media content in the media content information 116, as discussed above with reference to FIG. 1) associated with rated media content.

The operator labeling UI 600 can include a display 602 and. The display 602 can output a portion (e.g., an entire portion or a partial portion) of media content. The media content can include one or more video portions (e.g., the video portion 404, as discussed above with reference to FIG. 4).

The operator labeling UI 600 can include one or more descriptor selectors 604, one or more severity selectors 606, one or more start time selectors 608, one or more end time selectors 610, and one or more option selectors (e.g., remove row selector(s) and/or add row selector(s)) 612. The remove row selector(s) can be utilized to remove a row, including information associated with a video portion or a sub-portion (or "segment") of the video portion. The add row selector(s) can be utilized to add a row, including information associated with a video portion or sub-portion. Any of the rows can be associated with a same video portion and/or sub-portion as any other row, or one or more different video portions and/or sub-portions as any other row.

Individual descriptor selector(s) 604, individual severity selector(s) 606, individual start time selector(s) 608, individual end time selector(s) 610, and individual option selector(s) (e.g., remove row selector(s)) 612 can be associated with corresponding rows, which can be associated with corresponding portion(s) (e.g., sub-portions) of any of the video portion(s) (e.g., the video file or the video clip). By way of example, a row of selectors can be associated with a sub-portion of the video portion beginning at a start time indicated by the start time selector 608 and ending at an end time indicated by the end time selector.

By modifying any of the selectors, the user can review the movie portion(s) and update the descriptor and/or the severity associated with the media portion(s). In some examples, any of the descriptor(s) indicated via the corresponding descriptor selector 604 can be implemented as the content descriptor 324, as discussed above with reference to FIG. 3. In some examples, any of the seventies indicated via the corresponding severity selector 606 can be implemented as the rating 326, as discussed above with reference to FIG. 3.

The operator labeling UI 600 can include metadata 614. The metadata 614 can include information associated with the video portion(s). In some examples, the metadata 614 can include a title, a review type, a category type, and the like. The review type can be utilized to indicate that a video portion is being reviewed by itself, or whether more than one video portion are being reviewed. The category type can be utilized to indicate a category associated with the video portion. Categories can include a movie, a movie clip, an episode of a show, etc. Although the title, the review type, and the category type can be included in the metadata 614 as discussed above in the current disclosure, it is not limited as such. Any other of one or more types of information associated with the video portion(s) can be included in the metadata 614.

The operator labeling UI 600 can include a save and finalize selector 616. The operator labeling UI 600 can receive input via a selection of the save and finalize selector

616, to save information associated with any of the selectors 604-612 and/or with the metadata 614. The save and finalize selector 616 can be utilized to turn off, and/or remove one or more portions of any of the information from, the operator labeling UI 600.

Although the display 602, the selectors 604-612, the metadata 614, and the save and finalize selector 616 can be included in the operator labeling UI 600, as illustrated in FIGS. 6A and 6B, and as discussed above in the current disclosure, it is not limited as such. In some examples, any of one or more of the selectors 604-612, the metadata 614, and the save and finalize selector 616 can be included in the operator labeling UI 600 at any position. In additional or alternative examples, any of one or more types of other information associated with the video portion(s) can be included in the operator labeling UI 600 at any position.

As illustrated in FIG. 6B, in some examples, an operator labeling UI 618 can be implemented and utilized in a similar way as the operator labeling UI 600, except with content selectors 620 instead of descriptor selectors 604. By way of example, the operator labeling UI 618 can be utilized by a user to review and adjust (e.g., modify) information (e.g., the maturity rating information 108 and/or the rated media content in the media content information 116, as discussed above with reference to FIG. 1) associated with rated media content.

Instead of utilizing descriptor selectors 604 as discussed above with reference to FIG. 1, content selectors 620 can be utilized to identify (e.g., select) content included in a video portion or a sub-portion (or "segment") of the video portion. The video portion or the sub-portion can be output via the display 602. A user controlling the operator labeling UI 618 can view the video portion or the sub-portion and determine whether previously selected content (e.g., initially selected content) (e.g., a selection of content by the maturity rating information management system 102) is correct. The user can modify the content using the content selectors 620. In some examples, partial automation can include the maturity rating information management system 102 determine corresponding content descriptors according to any technique as discussed herein, based on the selected content. By way of example, the user selected content can be utilized to determine descriptors, ratings, and/or scores, along with any other information determined for a media portion (e.g., the video portion 304).

In some examples, the video portion or the sub-portion can be viewed by the user via the operator labeling UI 618 600 and/or the operator labeling UI 618 based on an omission of any selection of descriptors and/or content by the maturity rating information management system 102. In those examples, a flag and/or a value of a score can be set by the maturity rating information management system 102, to indicate a decision and/or an inability of the maturity rating information management system 102 to make an initial determination of the descriptors, the content, and/or a type (e.g., classification, etc.) of the content. The user can view the video portion or the sub-portion and select the descriptor and/or the content with a descriptor selector 604 or a content selector 620, respectively. In some examples, the user can determine select one, and/or switch between, the operator labeling UI 618 600 and the operator labeling UI 618, to select descriptors and/or content based on any flag and/or score of any type associated with any type of video portion or sub-portion.

Content that is selected via the operator labeling UI 618 600 and/or the operator labeling UI 618 can be associated, by the maturity rating information management system 102, with the video portion or the sub-portion. The descriptors (e.g., descriptor text selected by the user via the descriptor selector 604, and/or data representing the text) and/or the content (e.g., content text selected by the user via the content selector 620, and/or data representing the text) can be utilized by the maturity rating information management system 102 to determine the maturity rating information 108 (e.g., to include the text data associated with the content and/or the descriptor information in the maturity rating information 108). In some examples, the text data associated with the content and/or the descriptor information can be included in the maturity rating information 108 and/or in metadata associated with rated media content in the media content information 116.

In some examples, determining of maturity rating information 108 (e.g., the maturity rating information 108 as discussed above with reference to FIG. 1) can utilize the information selected via the operator labeling UI 600 and/or the operator labeling UI 618 (e.g., the descriptors selected via the descriptor selectors 604, the content selected via the content selectors 620, etc.) as part of partial automation. The maturity rating information 108 (e.g., content descriptors and maturity ratings) can be determined based on the media content information 106, and modified by the information determined via the operator labeling UI 600 and/or the operator labeling UI 618. In some examples in which no descriptors and/or content are determined by the maturity rating information management system 102, the partial automation can include utilizing the information selected via the operator labeling UI 600 and/or the operator labeling UI 618, based on the user reviewing the video portion or the sub-portion associated with the flag and/or the score.

Although the operator labeling UI 618 600 and/or the operator labeling UI 618 include various types of input components (e.g., drop down arrows, text boxes, etc.) as discussed above in the current disclosure, it is not limited as such. In some examples, any type of input component (e.g., drop down arrows, text boxes, toggle switches, scrolling selectors, etc.) can be utilized for any of the input components.

Figure 7:
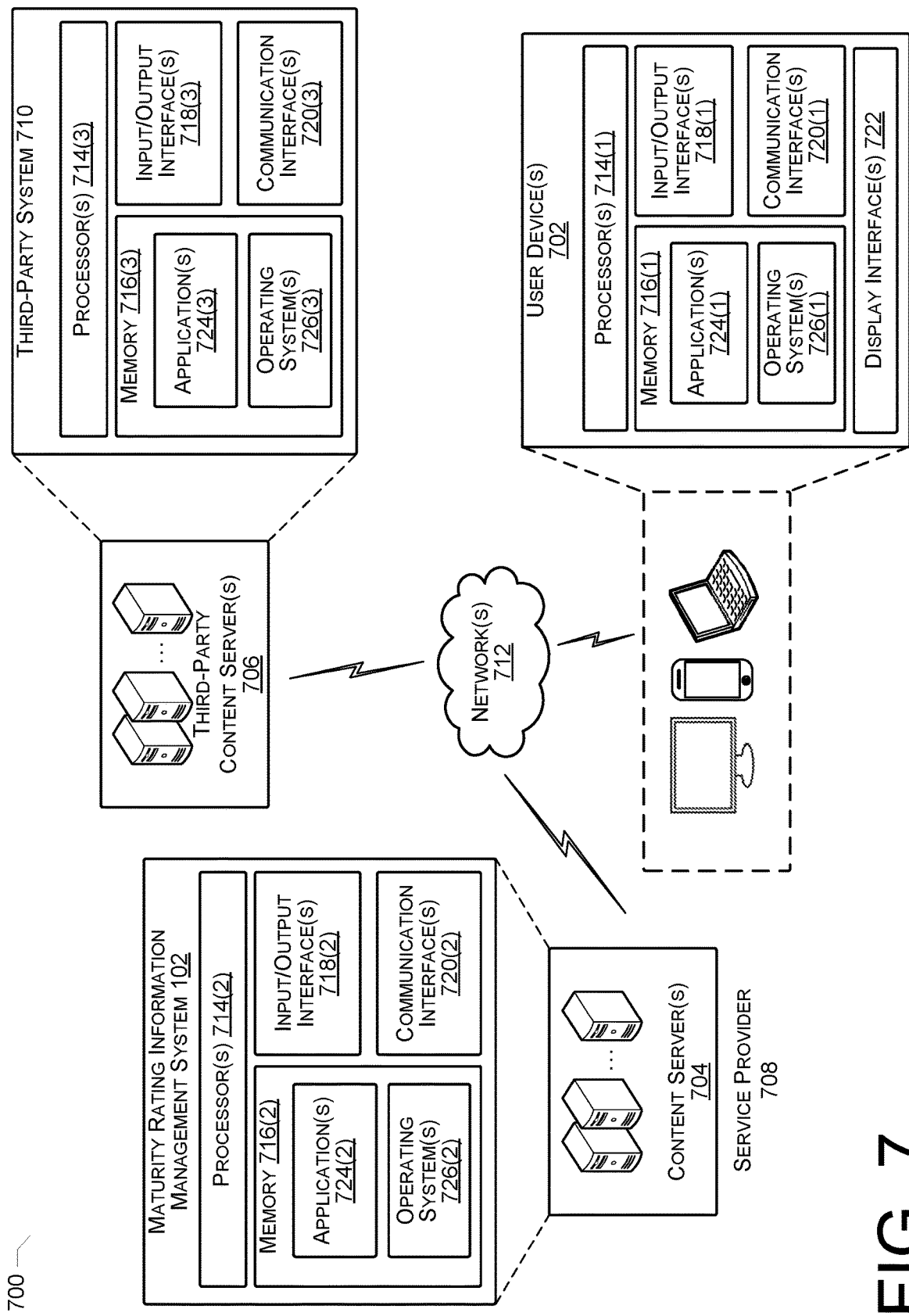
FIG. 7 is an example system that includes multiple devices that coordinate determining of age-appropriate media content ratings.

FIG. 7 is an example system 700 that includes multiple devices that coordinate determining of age-appropriate media content ratings. The devices may include one or more user devices 702, and one or more content servers 704, and one or more third-party content servers 706.

The user device(s) 702 may include one or more of the devices (e.g., local devices, remote devices, etc.), as discussed throughout this disclosure. Individual ones of the user device(s) 702 may utilized to implement any functions of the remote devices, as discussed throughout this disclosure. The content server(s) 704 may be associated with a service provider 708. The content server(s) 704 may be included in, and utilized to implement any functions of, the maturity rating information management system 102 shown in FIG. 1. The content server(s) 704 may be associated with a service provider 708. The third-party content server(s) 706 may be included in, and utilized to implement any functions of, a third-party system 710 (e.g., a system associated with a third-party service provider).

The user device(s) 702, the content server(s) 704, and the third-party content server(s) 706 may be configured to communicate with one another via one or more networks 712. The user device(s) 702 may communicate with the content server(s) 704 and the third-party content server(s) 706, such as to transmit requests to, and receive responses from, the content server(s) 704 and the third-party content server(s) 706. The user device(s) 702 may transmit any information associated with the requests to, and receive any information associated with the responses from, the content server(s) 704 and the third-party content server(s) 706. The user device(s) 702 may communicate between one another utilizing the network(s) 712. The content server(s) 704 may transmit any information associated with the requests to, and receive any information associated with the responses from, the third-party content server(s) 706. The third-party content server(s) 706 may transmit any information associated with the requests to, and receive any information associated with the responses from, the content server(s) 704.

The network(s) 712 may include the Internet, cable networks, cellular networks, wireless networks (e.g., Wi-Fi) and/or wired networks, as well as close-range communications such as Bluetooth®, Bluetooth® low energy, or the like. The user device(s) 702, the content server(s) 704, and/or the third-party content server(s) 706 may communicate among one another utilizing the same type, or different types, of networks (e.g., networks with different protocols). The network(s) 712 may include the Internet, cable networks, cellular networks, wireless networks (e.g., Wi-Fi) and/or wired networks, as well as close-range communications such as Bluetooth®, Bluetooth® low energy, or the like).

The user device(s) 702 may represent, but are not limited to, televisions (TVs), cellular telephones, desktop computers, server computers or blade servers such as web-servers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, voice-enabled device(s), or any other sort of computing device coverable of sending communications and performing the functions according to the techniques described herein. Among these TVs are liquid crystal display (LCD) TVs, light emitting diode (LED) TVs, organic light emitting diode (OLED) TVs, plasma display devices (PDP) TVs, quantum dot (QLED) TVs, and electroluminescent (ELD) TVs. In some examples, the voice-enabled device(s) of the user device(s) 702 may include devices with or without display components. In some examples, the display device(s) of the user device(s) 702 may include devices with or without speech processing components.

In the illustrated example, the user device(s) 702, the content server(s) 704, and/or the third-party content server(s) 706 include one or more processors 714(1), 714(2), and/or 714(3) (collectively processor(s) 714), at least one memory 716(1), 716(2), and/or 716(3) (collectively memory 716), one or more input/output (I/O) interfaces 718(1), 718(2), and/or 718(3) (collectively I/O interface(s) 718), and/or one or more communication (e.g., network) interfaces 720(1), 720(2), and/or 720(3) (collectively communication interface(s) 720). The user device(s) 704 may include one or more display interfaces 722. In some examples, one or more of the voice-controlled device(s) among the user device(s) 704 are controlled only by voice and do not include any display interface.

Each processor 714 may include multiple processors and/or a processor having multiple cores. Further, the processor(s) 714 may include one or more cores of different types. For example, the processor(s) 714 may include application processor units, graphic processing units, and so forth. In various examples, the processor(s) 714 may include one or more microprocessors, microcomputers, microcontrollers, digital signal processors, central processing units, state machines, logic circuitries, and/or any devices that manipulate signals based on operational instructions. In some examples, the processor(s) 714 may include one or more hardware processors and/or logic circuits of any suitable type specifically programmed or configured to execute the algorithms and processes described herein.

For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 714 may possess its own local memory, which also may store program components, program data, and/or one or more operating systems.

In some examples, the processor(s) 714 may be configured to fetch and execute computer-readable processor-executable instructions stored in the memory 716. Depending on the configuration of user device(s) 702, the content server(s) 704, and the third-party content server(s) 706, the memory 716 may be an example of tangible non-transitory computer storage media and may include volatile and non-volatile memory and/or removable and non-removable media implemented in any type of technology for storage of information such as computer-readable processor-executable instructions, data structures, program modules or other data. Such memory 716 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. The memory 716 may be implemented as computer-readable storage media ("CRSM"), which may be any available physical media accessible by the processor(s) 714 to execute instructions stored on the memory 716. In some examples, CRSM may include random access memory ("RAM") and Flash memory. In other examples, CRSM may include, but is not limited to, read-only memory ("ROM"), electrically erasable programmable read-only memory ("EEPROM"), or any other tangible medium which may be used to store the desired information, and which may be accessed by the processor(s) 714.

The memory 716 may be used to store and maintain any number of functional components that are executable by the processor 714. In some examples, these functional components include instructions or programs that are executable by the processor 714 and that, when executed, implement operational logic for performing the actions and services attributed above to the user device(s) 702, the content server(s) 704, and the third-party content server(s) 706. Functional components of the user device(s) 702, the content server(s) 704, and the third-party content server(s) 706 stored in the memory 716(1), 716(2), and/or 716(3) may include applications 724(1), 724(2), and/or 724(3) (collectively applications 724). The application(s) 724 may configure the respective devices to perform functions described herein such as with regard to FIGS. 1-3 and 5.

The functional components of the user device(s) 702, the content server(s) 704, and the third-party content server(s) 706 stored in the memory 716(1), 716(2), and/or 716(3) may additionally include operating systems 726(1), 726(2), and/or 726(3), respectively (collectively operating systems 726). The operating system(s) 726 for controlling and managing various functions of the user device(s) 702, the content server(s) 704, and the third-party content server(s) 706. The memory 716 may also store other modules and data, which may include programs, drivers, etc., and the data used or generated by the functional components, to enable efficient and effective food order processing. Further, the user device(s) 702, the content server(s) 704, and the third-party content server(s) 706 may include many other logical, programmatic and physical components, of which those described are merely examples that are related to the discussion herein. In addition, the memory 716 may also store data, data structures and the like, that are used by the functional components.

The I/O interface(s) 718, may include scanners (e.g., for scanning bar codes, QR codes, etc.), speakers, a microphone, a camera, and various user controls (e.g., buttons, a joystick, a keyboard, a keypad, etc.), a haptic output device, and so forth. The communication interface(s) 720 may include one or more interfaces and hardware components for enabling communication with various other devices over the network or directly.

Figure 8:
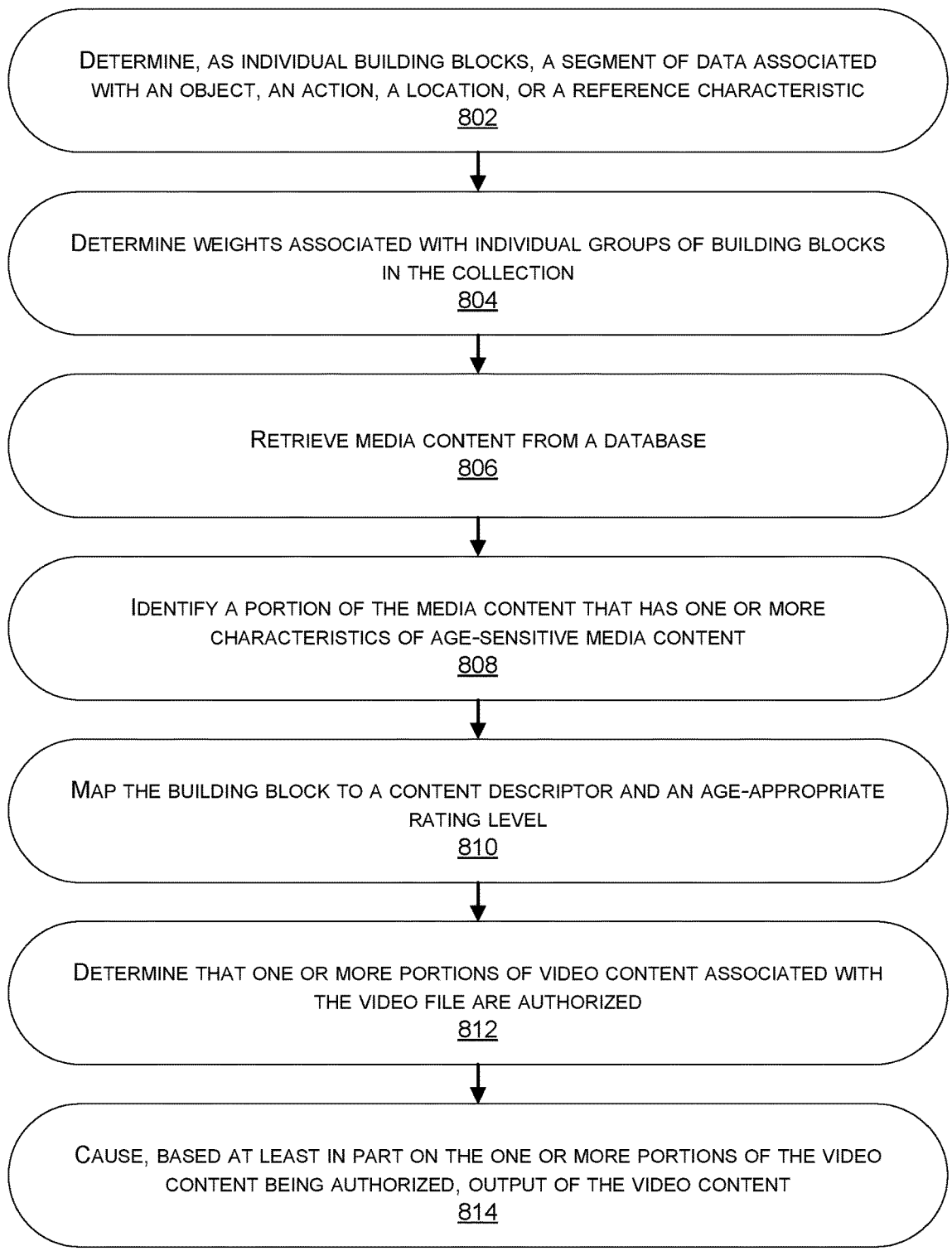
FIG. 8 is a flowchart depicting a process for an age-appropriate media content ratings determination system, in accordance with some examples of the present disclosure.

FIG. 8 is a flowchart depicting a process 800 for an age-appropriate media content ratings determination system, in accordance with some examples of the present disclosure.

At 802, the process 800 can include determining, as individual building blocks 416, a segment of data associated with an object, an action, a location, or a reference characteristic. The building blocks 416 can be included in a collection of groups 412 of building blocks.

At 804, the process 800 can include determining weights 420 associated with individual groups 412 of building blocks in the collection. The weights 420 can be utilized to indicate corresponding levels of importance of the building block(s) 416, to optimize processing of the ML model(s) component 402. In some examples, the weights 420 can be utilized to process the building block(s) 416, to emphasize processing of any of the building block group(s) 412 and/or any of the building block class(es) 416 based on the corresponding weights 420 having a higher value (e.g., a weight value that is greater than or equal to a threshold weight). The weights 420 can be utilized to process the building block(s) 416, to deemphasize processing of any of the building block group(s) 412 and/or any of the building block class(es) 416 based on the corresponding weights 420 having a relatively lower value (e.g., a weight value that is less than a threshold weight).

At 806, the process 800 can include retrieving media content (e.g., the unread media content in the media content information 106) from a database. The database can be included in the maturity rating information management system 102, or another internal or external system.

At 808, the process 800 can include identifying a portion (e.g., a sub-portion) of the media content (e.g., the video portion 404) that has one or more characteristics of age-sensitive media content. The sub-portion of the video portion 404 can be identified in a frame of a video file associated with the video portion 404 based on the collection of groups 412 of building blocks, and on the weights 420. The sub-portion of the video portion 404 can be mapped based on the sub-portion of the video portion 404 having one or more characteristics of age-sensitive media content represented by a building block 416 of a building block group 412 in the collection.

At 810, the process 800 can include mapping the building block 416 to a content descriptor and an age-appropriate rating level (e.g., an age-appropriate rating level of a local rating schema associated with a territory (e.g., a country or a portion of a country). The building block 416 can be mapped based on a mapping rule. By way of example, the building block 416 can be mapped based on the mapping rule in a similar way as for the building block 312 that is mapped based on the mapping rule 318. The mapping rule 318 utilized to map the building block 416 can be determined based on the schema 406.

At 812, the process 800 can include determining that one or more portions (e.g., sub-portion(s)) of video content (e.g., the video portion 404) associated with the video file are authorized. The determining that the sub-portion(s) of the video portion 404 are authorized can be based on the age-appropriate rating level (e.g., a rating similar to the rating 326).

At 814, the process 800 can include causing, based the one or more portions (e.g., sub-portion(s)) of the video content (e.g., the video portion 404) being authorized, output of the (e.g., the video portion 404). The video portion 404 can be output via the remote device, based on instructions received from a maturity rating information management system (e.g., the maturity rating information management system 102, which can be implemented using the media content ratings mapping component 302, and one or more of the ML model(s) components 402, 502, 508, 514, and 518).

Although the term "user" is utilized throughout this disclosure, it is not limited as such and the term "user" is utilized for simplicity. The term "user" as used throughout disclosure may denote any type of user, including a user, an administrator, an operator, etc.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
at least one processor; and
at least one non-transitory computer-readable storage medium having computer-executable instructions stored thereon which, when executed on the at least one processor, cause the system to perform operations comprising:
determining, as building blocks in a collection of building block groups, segments of data;
assembling individual ones of the building block groups into an assembled building block group in the collection that includes more than one building block sharing an association with a media content depiction of an object, an action, a location, or a reference characteristic;
determining weights associated with individual groups of building blocks in the collection;
retrieving a portion of media content from a database;
identifying, in a frame of a video file associated with the portion of the media content, utilizing a machine learning (ML) model, and based on the collection and the weights, the portion of the media content that has one or more characteristics of age-sensitive media content represented by a building block of a building block group in the collection;
mapping the building block to a text-based content descriptor that is selected from a local rating schema associated with a country, the mapping being based on at least one of a legal rule, a cultural norm rule, or a regional sensitivity rule;

mapping, based on the text-based content descriptor, the building block to an age-appropriate rating level in the local rating schema;

causing, via a remote device and based on the age-appropriate rating level and the text-based content descriptor, output of a video content identifier associated with the video file;

receiving, from the remote device, a request to receive video content in the video file, the request being received as a selection of the video content identifier indicated via user input received by the remote device;

determining, based on the request, that one or more portions of the video content are authorized based on the age-appropriate rating level; and causing, via the remote device and based on the one or more portions of the video content being authorized, output of the video content in the video file.

2. The system of claim 1, wherein:

the building block represents an age-sensitive character action;

identifying the portion of the media content further comprises identifying first movement of a first character in the video file, based on a first position of the first character in the frame, and a second position of the first character in at least one of a previous frame or a subsequent frame of the video file, with respect to the frame; and the portion of the media content is identified further based on the first movement of the first character having a same characteristic of second movement represented by the building block.

3. The system of claim 1, the operations further comprising:

determining, as a second building block, a segment of the segments of data and with second age-sensitive media content, the second age-sensitive media content including a second object;

adding the second building block to the building block group in the collection; and identifying, in the frame, output of the ML model as a second portion of the media content that has one or more second characteristics of the object in the second building block.

4. The system of claim 1, the operations further comprising:

mapping the building block to a second text-based content descriptor that is selected from a second local rating schema associated with a second country, the mapping of the building block to the second text-based content descriptor being based on at least one of a second legal rule, a second cultural norm rule, or a second regional sensitivity rule; and mapping, based on the second text-based content descriptor, the building block to a second age-appropriate rating level in the second local rating schema.

5. The system of claim 1, the operations further comprising:

determining that a score associated with the age-appropriate rating level triggers manual inspection of the video file; and receiving, from the remote device and based on the score, a second selection of an updated age-appropriate rating level indicated via second user input received by the remote device.

6. The system of claim 1, wherein the more than one building block being assembled in individual ones of the building block groups are associated with more than one corresponding portion of the media content in more than one corresponding media content file.

7. A system comprising:

at least one processor; and at least one non-transitory computer-readable storage medium having computer-executable instructions stored thereon which, when executed by the at least one processor, cause the system to perform operations comprising:

determining, as building blocks in a collection of building block groups, segments of data, individual ones of the building block groups including more than one building block sharing an association with a media content depiction of an object, an action, a location, or a reference characteristic;

determining weights associated with individual groups of building blocks in the collection;

retrieving a portion of media content from a database;

identifying, in a frame of a video file associated with the portion of the media content and based at least in part on the collection and the weights, the portion of the media content that has one or more characteristics of age-sensitive media content represented by a building block of a building block group in the collection;

mapping the building block to a content descriptor and an age-appropriate rating level of a local rating schema associated with a country;

determining, based at least in part on the age-appropriate rating level, that one or more portions of video content associated with the video file are authorized; and causing, via a remote device and based at least in part on the one or more portions of the video content being authorized, output of the video content.

8. The system of claim 7, wherein a segment of the segments of data is associated with the reference characteristic, the reference characteristic is utilized to determine a confidence value associated with identifying at least one of the object, the action, or the location, and determining the segment of data further comprises determining, as individual building blocks in the collection, the segment of data associated with the reference characteristic.

9. The system of claim 7, wherein the age-sensitive media content is identified utilizing at least one of a legal regulation or guideline, a cultural norm guideline, or a regional sensitivity guideline, the legal regulation or guideline including legal data indicating the age-sensitive media content is proscribed by a government of the country, the cultural norm guideline including cultural norm data indicating the age-sensitive media content is contrary to beliefs or viewpoints held by a first percentage of people that identify themselves as being associated with a demographic, the demographic including at least one of an age range, a race or ethnicity, a nationality, a religion, a philosophy, a family status or history, an income or economic status, a political affiliation, an occupation, a sexual orientation or identity, a pastime, or a social sphere, the regional sensitivity guideline including regional sensitivity guideline data indicating the age-sensitive media content is contrary to local beliefs or viewpoints held by a second percentage of people located in the country.

10. The system of claim 7, wherein:

the building block represents an age-sensitive character action;

identifying the portion of the media content further comprises identifying first movement of a first character in the video file, based at least in part on a first position of the first character in the frame, and a second position of the first character in at least one of a previous frame or a subsequent frame of the video file, with respect to the frame; and the portion of the media content is identified further based at least in part on the first movement of the first character having a same characteristic of second movement represented by the building block.

11. The system of claim 7, the operations further comprising:

determining, as a second building block, a segment of the segments of data and with second age-sensitive media content, the second age-sensitive media content including a second object;

adding the second building block to the building block group in the collection; and identifying, in the frame, a second portion of the media content that has one or more second characteristics of the object in the second building block.

12. The system of claim 7, the operations further comprising:

mapping the building block to a second text-based content descriptor that is selected from a second local rating schema associated with a second country, the mapping of the building block to the second text-based content descriptor being based at least in part on at least one of a legal rule, a cultural norm rule, or a regional sensitivity rule; and mapping, based at least in part on the second text-based content descriptor, the building block to a second age-appropriate rating level in the second local rating schema.

13. The system of claim 7, the operations further comprising:

determining that a score associated with the age-appropriate rating level triggers manual inspection of the video file; and receiving, from the remote device and based at least in part on the score, a second selection of an updated age-appropriate rating level indicated via second user input received by the remote device.

14. The system of claim 7, the operations further comprising:

expanding the collection to include, as a second building block not initially included in the collection, a segment of the segments of data associated with the location or the reference characteristic; and identifying, in a second frame of the video file, a second portion of the media content that has one or more second characteristics of second age-sensitive media content represented by the second building block.

15. A method comprising:

determining, as building blocks in a collection of building blocks groups, segments of data, individual ones of the building block groups including more than one building block sharing an association with a media content depiction of an object, an action, a location, or a reference characteristic;

determining weights associated with individual groups of building blocks in the collection;

retrieving a portion media content from a database;

identifying, in a frame of a video file associated with the portion of the media content and based at least in part on the collection and the weights, a portion of the media content that has one or more characteristics of age-sensitive media content represented by a building block of a building block group in the collection;

mapping the building block to a content descriptor and an age-appropriate rating level of a local rating schema associated with a country;

determining, based at least in part on the age-appropriate rating level, that one or more portions of video content associated with the video file are authorized; and causing, via a remote device and based at least in part on the one or more portions of the video content being authorized, output of the video content.

16. The method of claim 15, wherein a segment of the segments of data is associated with the reference characteristic, the reference characteristic is utilized to determine a confidence value associated with identifying at least one of the object, the action, or the location, and determining the segment of data further comprises determining, as individual building blocks in the collection, the segment of data associated with the reference characteristic.

17. The method of claim 15, wherein the age-sensitive media content is identified utilizing at least one of a legal regulation or guideline, a cultural norm guideline, or a regional sensitivity guideline, the legal regulation or guideline including legal data indicating the age-sensitive media content is proscribed by a government of the country, the cultural norm guideline including cultural norm data indicating the age-sensitive media content is contrary to beliefs or viewpoints held by a first percentage of people that identify themselves as being associated with a demographic, the demographic including at least one of an age range, a race or ethnicity, a nationality, a religion, a philosophy, a family status or history, an income or economic status, a political affiliation, an occupation, a sexual orientation or identity, a pastime, or a social sphere, the regional sensitivity guideline including regional sensitivity guideline data indicating the age-sensitive media content is contrary to local beliefs or viewpoints held by a second percentage of people located in the country.

18. The method of claim 15, wherein:

the building block represents an age-sensitive character action;

identifying the portion of the media content further comprises identifying first movement of a first character in the video file, based at least in part on a first position of the first character in the frame, and a second position of the first character in at least one of a previous frame or a subsequent frame of the video file, with respect to the frame; and the portion of the media content is identified further based at least in part on the first movement of the first character having a same characteristic of second movement represented by the building block.

19. The method of claim 15, further comprising:

determining, as a second building block, a segment of the segments of data and with second age-sensitive media content, the second age-sensitive media content including the object;

adding the second building block to the building block group in the collection; and identifying, in the frame, a second portion of the media content that has one or more second characteristics of the object in the second building block.

20. The method of claim 15, further comprising:

mapping the building block to a second text-based content descriptor that is selected from a second local rating schema associated with a second country, the mapping of the building block to the second text-based content descriptor being based at least in part on at least one of a legal rule, a cultural norm rule, or a regional sensitivity rule; and mapping, based at least in part on the second text-based content descriptor, the building block to a second age-appropriate rating level in the second local rating schema.

* * * * *